United States Patent
Wang et al.

(10) Patent No.: US 12,356,425 B2
(45) Date of Patent: Jul. 8, 2025

(54) SIDELINK GRANT COLLISION HANDLING

(71) Applicant: QUALCOMM Incorporated, San Diego, CA (US)

(72) Inventors: Xiaojie Wang, Hillsborough, NJ (US); Gabi Sarkis, San Diego, CA (US); Xiaoxia Zhang, San Diego, CA (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/811,733

(22) Filed: Jul. 11, 2022

(65) Prior Publication Data

US 2023/0038205 A1 Feb. 9, 2023

Related U.S. Application Data

(60) Provisional application No. 63/203,928, filed on Aug. 4, 2021.

(51) Int. Cl.
*H04W 72/14* (2009.01)
*H04W 72/23* (2023.01)
(Continued)

(52) U.S. Cl.
CPC ......... *H04W 72/23* (2023.01); *H04W 72/569* (2023.01); *H04W 92/18* (2013.01)

(58) Field of Classification Search
CPC ... H04W 72/23; H04W 75/569; H04W 92/18; H04W 76/14; H04W 76/23; H04W 72/02;
(Continued)

(56) References Cited

U.S. PATENT DOCUMENTS

| 2024/0022356 A1* | 1/2024 | Lee | H04W 72/23 |
| 2024/0040577 A1* | 2/2024 | Ryu | H04W 72/25 |
| 2024/0089976 A1* | 3/2024 | Wang | G01S 5/0036 |

FOREIGN PATENT DOCUMENTS

| EP | 3796731 A1 * | 3/2021 | ............ H04W 72/23 |
| WO | WO-2020168223 A1 * | 8/2020 | ............... H04L 1/08 |

OTHER PUBLICATIONS

Huawei., et al., "Discussion on Remaining MAC Open Issues for 5G V2X with NR SL", 3GPP TSG-RAN WG2 Meeting #109-bis electronic, R2-2003555, 3rd Generation Partnership Project (3GPP), Mobile Competence Centre, 650, Route Des Lucioles, F-06921 Sophia-Antipolis Cedex, France, vol. RAN WG2, No. Electronic, Apr. 20, 2020-Apr. 30, 2020, Apr. 10, 2020, pp. 1-28, XP051871480, chapter 2.8 on pp. 13 and 14, chapter 3.1.1.2.
(Continued)

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, an indication of a first sidelink grant associated with a first set of resources. The UE may receive, from the network entity, an indication of a second sidelink grant associated with a second set of resources, wherein the first set of resources at least partially overlaps in a time domain with the second set of resources. The UE may perform an action based at least in part on the first set of resources at least partially overlapping in the time domain with the second set of resources. The UE may transmit one or more sidelink messages using at least one of the first sidelink grant or the second sidelink grant based at least in part on performing the action. Numerous other aspects are described.

30 Claims, 8 Drawing Sheets

(51) Int. Cl.
*H04W 72/566* (2023.01)
*H04W 92/18* (2009.01)

(58) Field of Classification Search
CPC . H04W 72/541; H04W 72/563; H04W 72/40; H04W 88/04; H04W 72/115
See application file for complete search history.

(56) References Cited

OTHER PUBLICATIONS

International Search Report and Written Opinion—PCT/US2022/073629—ISA/EPO—Nov. 15, 2022.

\* cited by examiner

SIDELINK GRANT COLLISION HANDLING

CROSS-REFERENCE TO RELATED APPLICATION

This patent application claims priority to U.S. Provisional Patent Application No. 63/203,928, filed on Aug. 4, 2021, entitled "SIDELINK GRANT COLLISION HANDLING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink grant collision handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a base station, an indication of a first sidelink grant associated with a first set of resources. The one or more processors may be configured to receive, from the base station, an indication of a second sidelink grant associated with a second set of resources, wherein the first set of resources at least partially overlaps in a time domain with the second set of resources. The one or more processors may be configured to perform an action based at least in part on the first set of resources at least partially overlapping in the time domain with the second set of resources. The one or more processors may be configured to transmit one or more sidelink messages using at least one of the first sidelink grant or the second sidelink grant based at least in part on performing the action.

Some aspects described herein relate to a method of wireless communication performed by a UE. The method may include receiving, from a base station, an indication of a first sidelink grant associated with a first set of resources. The method may include receiving, from the base station, an indication of a second sidelink grant associated with a second set of resources, wherein the first set of resources at least partially overlaps in a time domain with the second set of resources. The method may include performing an action based at least in part on the first set of resources at least partially overlapping in the time domain with the second set of resources. The method may include transmitting one or more sidelink messages using at least one of the first sidelink grant or the second sidelink grant based at least in part on performing the action.

Some aspects described herein relate to a non-transitory computer-readable medium that stores a set of instructions for wireless communication by a UE. The set of instructions, when executed by one or more processors of the UE, may cause the UE to receive, from a base station, an indication of a first sidelink grant associated with a first set of resources. The set of instructions, when executed by one or more processors of the UE, may cause the UE to receive, from the base station, an indication of a second sidelink grant associated with a second set of resources, wherein the first set of resources at least partially overlaps in a time domain with the second set of resources. The set of instructions, when executed by one or more processors of the UE, may cause the UE to perform an action based at least in part on the first set of resources at least partially overlapping in the time domain with the second set of resources. The set of instructions, when executed by one or more processors of the UE, may cause the UE to transmit one or more sidelink messages using at least one of the first sidelink grant or the second sidelink grant based at least in part on performing the action.

Some aspects described herein relate to an apparatus for wireless communication. The apparatus may include means for receiving, from a base station, an indication of a first sidelink grant associated with a first set of resources. The apparatus may include means for receiving, from the base station, an indication of a second sidelink grant associated with a second set of resources, wherein the first set of resources at least partially overlaps in a time domain with the second set of resources. The apparatus may include means for performing an action based at least in part on the first set of resources at least partially overlapping in the time domain with the second set of resources. The apparatus may include means for transmitting one or more sidelink messages using at least one of the first sidelink grant or the second sidelink grant based at least in part on performing the action.

Aspects generally include a method, apparatus, system, computer program product, non-transitory computer-readable medium, user equipment, base station, network node, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
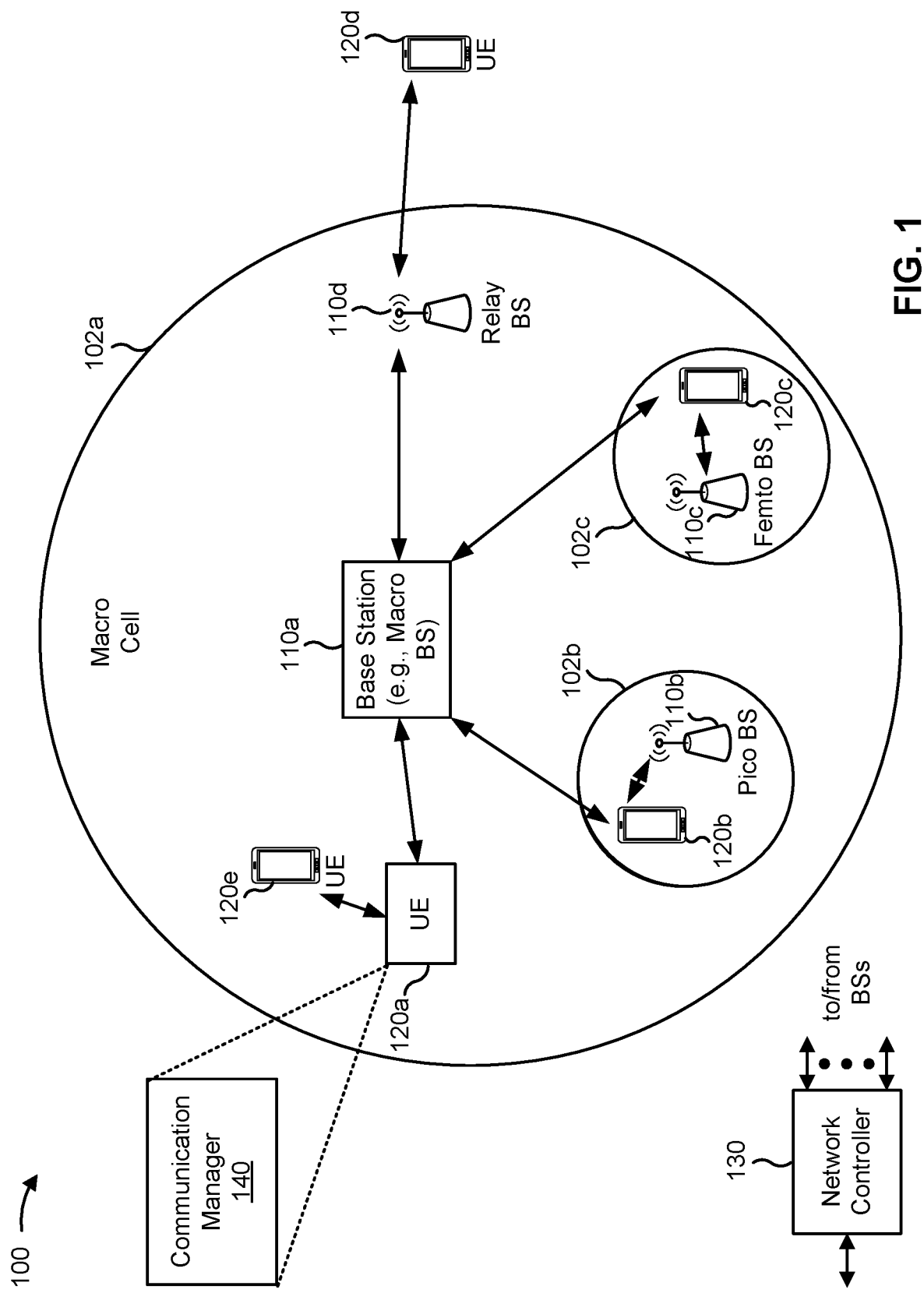
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120

(shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station 110, an indication of a first sidelink grant associated with a first set of resources; receive, from the base station 110, an indication of a second sidelink grant associated with a second set of resources, wherein the first set of resources at least partially overlaps in a time domain with the second set of resources; perform an action based at least in part on the first set of resources at least partially overlapping in the time domain with the second set of resources; and/or transmit one or more sidelink messages using at least one of the first sidelink grant or the second sidelink grant based at least in part on performing the action. Additionally, or alternatively, the communication manager 140 may perform one or more other operations described herein.

As indicated above, FIG. 1 is provided as an example. Other examples may differ from what is described with regard to FIG. 1.

Figure 2:
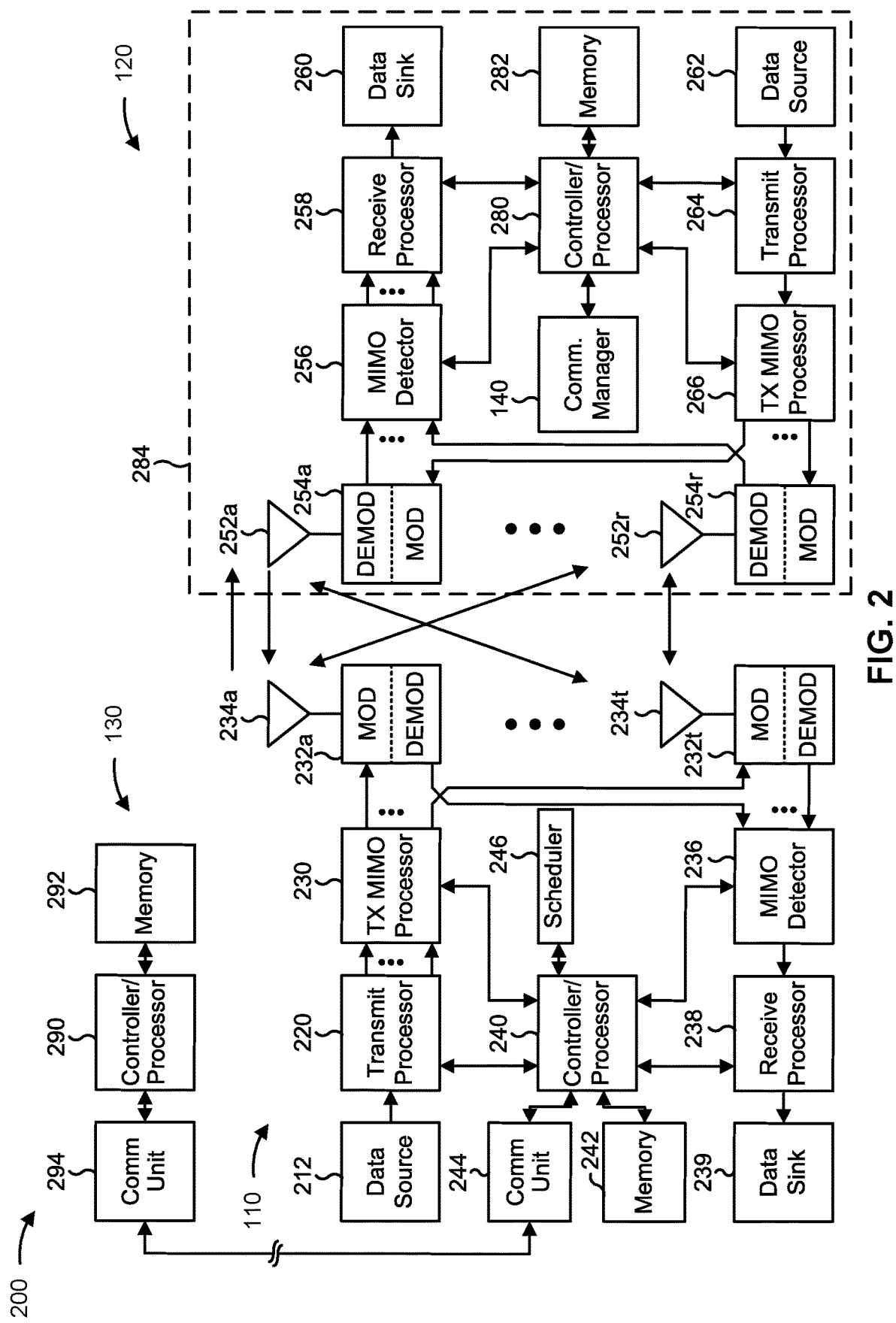
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-8).

The controller/processor 240 of the base station 110, the controller/processor 280 of the UE 120, and/or any other component(s) of FIG. 2 may perform one or more techniques associated with sidelink grant collision handling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication of a first sidelink grant associated with a first set of resources; means for receiving, from the base station, an indication of a second sidelink grant associated with a second set of resources, wherein the first set of resources at least partially overlaps in a time domain with the second set of resources; means for performing an action based at least in part on the first set of resources at least partially overlapping in the time domain with the second set of resources; and/or means for transmitting one or more sidelink messages using at least one of the first sidelink grant or the second sidelink grant based at least in part on performing the action. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. For example, in a disaggregated base station architecture, a control unit (CU) may communicate with a core network via a backhaul link. Furthermore, the CU may communicate with one or more distributed units (DUs) via respective midhaul links. The DUs may each communicate with one or more radio units (RUs) via respective fronthaul links, and the RUs may each communicate with respective UEs via radio frequency (RF) access links. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
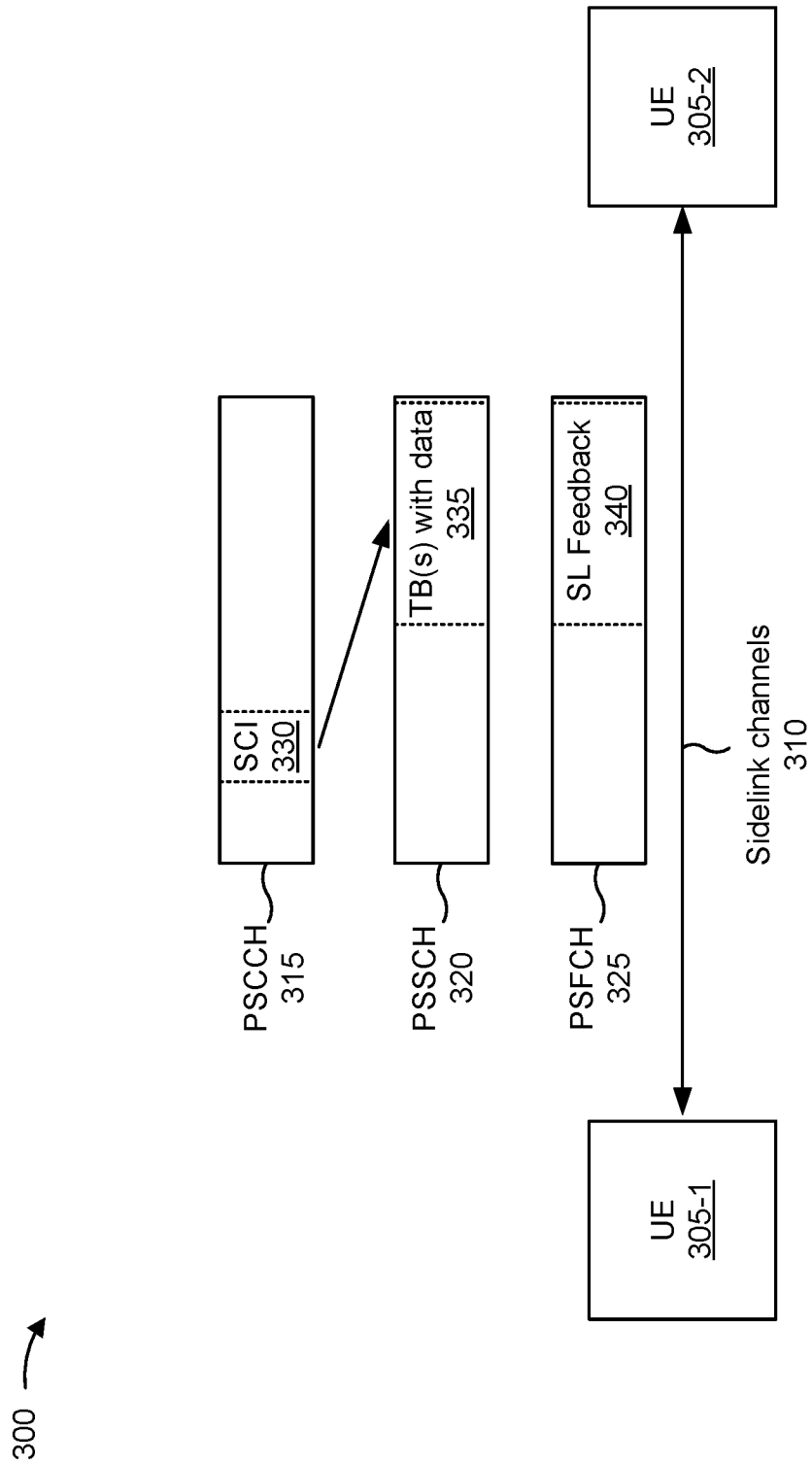
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. For example, a base station 110 may transmit, to a UE (e.g., UE 305-1 and/or UE 305-2) one or more sidelink grants that indicate resources (e.g., time resources, frequency resources, and/or spatial resources) that can be used by the UE to transmit the TB 335 on the PSSCH 320. A sidelink grant may include a dynamic grant and/or a configured grant (CG), among other examples.

The TB 335 may include data. The PSFCH 325 may be used to communicate sidelink feedback 340, such as hybrid automatic repeat request (HARQ) feedback (e.g., acknowledgement (ACK) or negative acknowledgement (NACK) (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some other cases, the UE 305 may operate in a transmission mode where resource selection and/or scheduling is performed by a base station 110. For example, the base station 110 may generate sidelink grants, and may transmit the grants in control information (e.g., PDCCH messages, radio resource control (RRC) messages, or downlink control information (DCI) messages). For example, the base station 110 may indicate one or more sidelink grants to the UE 305. The UE 305 may use a sidelink grant (indicated and/or configured by the base station 110) to transmit the TB 335 on the PSSCH 320 (e.g., to transmit data on the sidelink channel). The transmission mode where resource selection and/or scheduling for sidelink data is performed by a base station 110 may be referred to as a "mode 1" or a "transmission mode 1." The transmission mode where resource selection and/or scheduling for sidelink data is performed by a UE may be referred to as a "mode 2" or a "transmission mode 2."

As indicated above, FIG. 3 is provided as an example. Other examples may differ from what is described with respect to FIG. 3.

Figure 4:
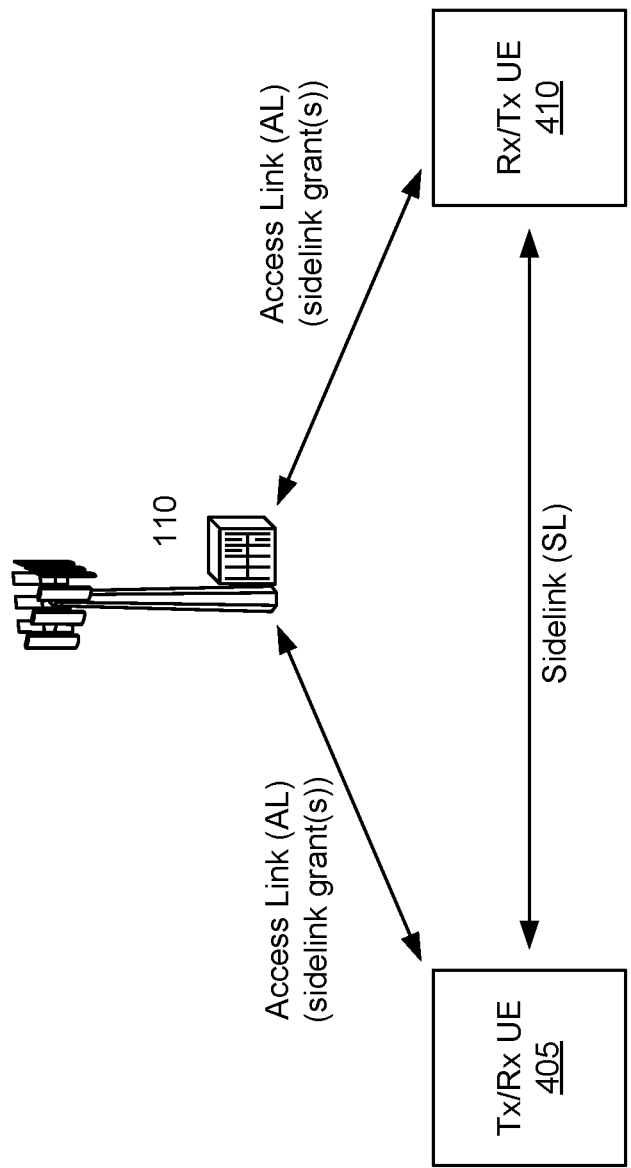
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As shown in FIG. 4, the base station 110 may transmit one or more sidelink grants to a UE via an access link (e.g., via a direct link between the base station 110 and the UE). For example, when the UE 405 and/or the UE 410 are operating in the transmission mode 1, the base station 110 may perform resource selection and/or scheduling for sidelink data to be transmitted by the Tx/Rx UE 405 and/or the Rx/Tx UE 410. The base station 110 may indicate the selected resources and/or the scheduled resources to the Tx/Rx UE 405 and/or the Rx/Tx UE 410 by transmitting an indication of a sidelink grant via an access link.

In the transmission mode 1, the base station 110 specifies resources, via DCI on the access link, for UE 405 and/or the UE 410 to use for transmitting a sidelink communication. The base station 110 may transmit DCI to schedule the sidelink communication and indicate a HARQ feedback report timing (e.g., timing value k for a time duration between receiving DCI and transmitting HARQ feedback). The base station 110 may indicate a resource indicator, and the sidelink HARQ feedback that is reported by the UE 405 and/or the UE 410 may depend on a PSFCH resource specified by the base station 110. The base station 110 may configure a type 1 sidelink CG, and an RRC parameter may include a parameter (e.g., sl-ACKtoUL-ACK) to indicate a timing for the sidelink HARQ feedback. The base station 110 may configure a type 2 sidelink CG, and activation DCI 3_0 may provide the timing for the sidelink HARQ feedback.

As indicated above, FIG. 4 is provided as an example. Other examples may differ from what is described with respect to FIG. 4.

Figure 5:
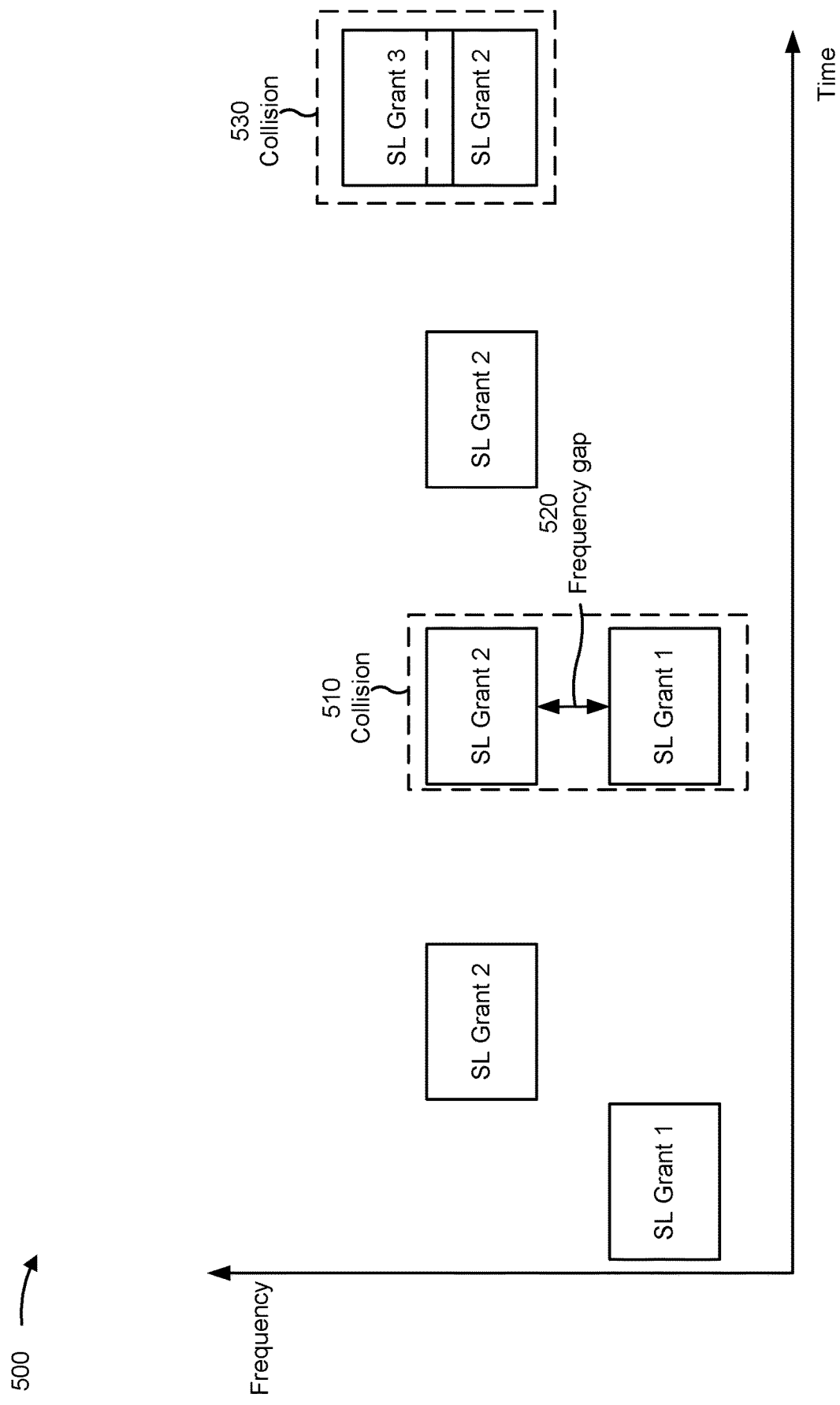
FIG. 5 is a diagram illustrating an example of sidelink grant collisions, in accordance with the present disclosure.

FIG. 5 is a diagram illustrating an example 500 of sidelink grant collisions, in accordance with the present disclosure. As used herein, "collision" may refer to a set of resources for a first sidelink grant and a set of resources for a second sidelink grant at least partially overlapping in the time domain and/or in the frequency domain. For example, a collision may occur between two dynamic grant (DG) sidelink grants, between two CG sidelink grants, and/or between a DG sidelink grant and a CG sidelink grant. "DG" or "dynamic grant" may refer to a dynamically scheduled sidelink grant. A DG sidelink grant may be a sidelink grant that is associated with an explicit message (e.g., a DCI message) scheduling each occasion of the DG sidelink grant. A "CG" or "configured grant" may configure a set of periodically occurring sidelink grants or occasions, where some of the grants or occasions may not be explicitly associated with any signaling from the base station 110 or another network entity. For example, a DG sidelink grant may be scheduled by the base station 110 for a single, or a "one-off," sidelink transmission. A CG sidelink grant may be scheduled for periodic or recurring sidelink transmissions.

A CG configuration with regular periodic CG sidelink occasions with a dedicated resource allocation for the UE 120 may be convenient for a UE with periodic sidelink traffic (such as with trivial jitter). The CG configuration may configure the periodicity associated with the resource allocation to associate CG sidelink occasions with periodic nominal arrival times at which sidelink traffic to be transmitted by the UE 120 is expected to arrive at (or be ready to be transmitted by) the UE 120. However, the actual arrival times at which the traffic arrives (or is ready to be transmitted) by the UE 120 may be different than the nominal arrival times, and this difference in times is known as jitter. In some examples, traffic jittering may be handled by configuring multiple CGs around the nominal arrival times. In some examples, multiple opportunities for the UE 120 to transmit the sidelink communication may be defined within a CG sidelink grant. The UE 120 may be configured with multiple CG sidelink grants to allow the UE 120 to repeatedly transmit the CG sidelink communications and increase the likelihood that the sidelink communications are successfully transmitted.

For example, a base station 110 may transmit, to a UE 120, a CG configuration. For example, the base station may transmit configuration information (such as in an RRC message, in a DCI message, or in another signaling message) that identifies the sidelink CG. In some examples, the configuration information identifying the sidelink CG may indicate a resource allocation (e.g., in a time domain, frequency domain, spatial domain, and/or code domain) and/or a periodicity associated with the resource allocation, among other examples. The sidelink CG may identify a resource or set of resources available to the UE 120 for transmission of a sidelink communication (e.g., sidelink data or sidelink control information). For example, the CG configuration may identify a resource allocation for a PSSCH. In some examples, the CG configuration may identify a resource pool or multiple resource pools that may be available to the UE 120 for a sidelink message.

A CG configuration may be a Type 1 CG or a Type 2 CG. In a Type 1 CG configuration, the UE 120 may perform sidelink data transmission without a grant based at least in part on an RRC (re)configuration without any Layer-1 (L1) signaling (e.g., without any DCI signaling from the base station 110). In a Type 2 CG configuration, the UE 120 may perform sidelink data transmission without a grant based at least in part on an RRC (re)configuration in combination with L1 signaling (e.g., DCI signaling). The L1 signaling (e.g., the DCI signaling) may activate or release the Type 2 CG configuration. For example, for a Type 1 CG, RRC signaling provides the CG configuration to the UE 120 through a higher layer parameter (such as an SL-ConfiguredGrantConfig information element including an rrc-ConfiguredSidelinkGrant information element) without the detection (e.g., by the UE 120) of any uplink grant in a DCI. For a Type 2 CG, an additional L1 signaling (DCI signaling) is introduced, where the uplink grant is semi-persistently scheduled by a grant in an activation DCI. The grant may be activated and deactivated through DCI. The CG configuration may indicate a frequency domain resource allocation, a time domain resource allocation, a periodicity, and/or a HARQ process identifier, among other examples.

For a UE 120, the base station 110 may configure and/or activate multiple sidelink CGs. For example, in some cases, the base station 110 may configure and/or activate up to 8 sidelink CGs for a single UE 120. As described elsewhere herein, the resources associated with a sidelink CG and/or a periodicity associated with the sidelink CG may be based at least in part on periodic traffic arrival at the UE 120. In other words, the base station 110 may configure the sidelink CGs based at least in part on when the UE 120 is expected to have sidelink traffic to transmit.

As shown in FIG. 5, a set of sidelink grants for a UE 120 are depicted. The sidelink grants shown in FIG. 5 may be CG sidelink grants or a DG sidelink grants. For example, a first sidelink grant (SL grant 1) may be associated with 2 occasions. For example, the first sidelink grant may be a CG sidelink grant associated with a first periodicity. Alternatively, the first sidelink grant may be a DG sidelink grant where the first occasion is associated with an initial transmission of a sidelink message, and the second occasion is associated with a retransmission of the sidelink message. A second sidelink grant (SL grant 2) may be associated with 4 occasions, as shown in FIG. 5. For example, the second sidelink grant may be a CG sidelink grant associated with a second periodicity.

As shown by reference number 510, a collision may occur between the second occasion of the first sidelink grant and the second occasion of the second sidelink grant. For example, as shown in FIG. 5, the set of resources associated with the first sidelink grant and the set of resources associated with the second sidelink grant may at least partially overlap in the time domain. There may be a frequency gap 520 between the set of resources associated with the first sidelink grant and the set of resources associated with the second sidelink grant. In other words, the set of resources associated with the first sidelink grant and the set of resources associated with the second sidelink grant may not overlap in the frequency domain. Although the resources do not overlap in the frequency domain, a collision may still occur because the UE 120 is scheduled to transmit using two different sidelink grants in the same time domain resources (e.g., in the same slot or the same TTI). For example, in some cases, a UE 120 may not be capable of transmitting multiple sidelink messages in the same slot or the same TTI.

As shown by reference number 530, a collision may occur between the fourth occasion of the second sidelink grant and a first occasion of a third sidelink grant (SL grant 3). The third sidelink grant may be a DG sidelink grant. Alternatively, the third sidelink grant may be a CG sidelink grant. As shown in FIG. 5, the set of resources associated with the second sidelink grant and the set of resources associated with the third sidelink grant may at least partially overlap in the time domain and the frequency domain. In other words, the second sidelink grant and the third sidelink grant may occupy one or more common frequency domain resources (e.g., one or more common resource blocks and/or subchannels) and one or more common time domain resources (e.g., one or more common slots and/or symbols).

Although FIG. 5 depicts examples of collisions between two sidelink grants, a collision may involve more than two sidelink grants. For example, two or more sidelink grants may collide in a similar manner as described herein. A collision of sidelink grants may degrade performance of the UE 120. For example, when two or more sidelink grants collide, the UE 120 may only transmit on one of the sidelink grants associated with the collision. In some cases, the UE 120 may not transmit on any sidelink grants associated with a collision. Moreover, the base station 110 or another network entity may be unable to resolve collisions associated with CG sidelink grants because the CG sidelink grants may be configured based at least in part on traffic pattern(s) of the UE 120 (and therefore the base station 110 and/or network entity may be unable to modify the resources and/or periodicity associated with a CG sidelink grant without diverging from the traffic pattern). As a result, the UE 120 may be unable to transmit using some (or all) of the sidelink grants associated with a collision. This may result in dropped (or not transmitted) sidelink messages, degraded efficiency associated with transmitting sidelink messages, and/or degraded performance associated with transmitting sidelink messages, among other examples.

Some techniques and apparatuses described herein enable sidelink grant collision handling. For example, when a collision among sidelink grants is detected by a UE 120, the UE 120 may perform one or more actions to resolve the collision. For example, the UE 120 may select one or more sidelink grants, from the sidelink grants associated with the collision, to be used for sidelink transmissions. The UE 120 may refrain from transmitting using the remaining (e.g., the not selected) sidelink grants associated with the collision. In some aspects, a number of sidelink grants that can be selected by the UE 120 may be based at least in part on a threshold (e.g., the threshold may define an upper bound on the number of sidelink grants that can be selected by the UE 120 from the sidelink grants associated with the collision).

As a result, the UE 120 may be enabled to efficiently handle sidelink grant collisions. For example, the UE 120 may be enabled to determine which sidelink grants and/or how many sidelink grants to use for sidelink messages when a collision occurs. For example, the UE 120 may be enabled to ensure that sidelink messages associated with a higher priority are transmitted when the sidelink grant to be used to transmit the sidelink message(s) is associated with a collision. As a result, the UE 120 may be enabled to transmit one or more sidelink messages using one or more sidelink grants associated with a collision based at least in part on performing one or more actions as described in more detail elsewhere herein. This may allow for additional sidelink grants to be scheduled and/or configured by the base station 110 (e.g., because the UE 120 is provided with mechanisms to handle potential collisions), improving a scheduling flexibility for the sidelink channel. Additionally, the sidelink grant collision handling described herein may improve efficiency associated with transmitting sidelink messages, and/or improve performance associated with transmitting sidelink messages, among other examples.

In some aspects, the UE 120 may select one or more sidelink grants, from the sidelink grants associated with the collision, based at least in part on a capability of the UE 120, a transmit power budget of the UE 120, a frequency gap between sidelink grants, a priority associated with the sidelink grants (or with data to be transmitted using the sidelink grants), and/or an index value associated with the sidelink grants, among other examples. In some aspects, such as when colliding sidelink grants overlap in the frequency domain, the UE 120 may allocate overlapping (or common) frequency domain resources to one of the sidelink grants and may remove the overlapping (or common) frequency domain resources (e.g., may puncture) the other sidelink grant. The allocation and/or removal of the overlapping (or common) frequency domain resources may be based at least in part on a size (e.g., a packet size) of data to be transmitted using the colliding sidelink grants, a priority associated with the colliding sidelink grants, and/or CSI associated with the sidelink channel, among other examples.

In some aspects, the UE 120 may perform one or more actions to resolve the collision based at least in part on a type of sidelink grants associated with the collision. For example, the UE 120 may perform an action to resolve a collision if the collision involves at least one (or only) CG sidelink grants. In some aspects, if the collision involves at least one (or only) DG sidelink grants, the UE 120 may refrain from performing an action to resolve the collision. In some aspects, the UE 120 may first resolve collisions among sidelink grants of different types, as described herein, and may second (e.g., after resolving collisions among sidelink grants of different types) resolve collisions among sidelink grants of the same type, if any remain.

As indicated above, FIG. 5 is provided as an example. Other examples may differ from what is described with respect to FIG. 5.

Figure 6:
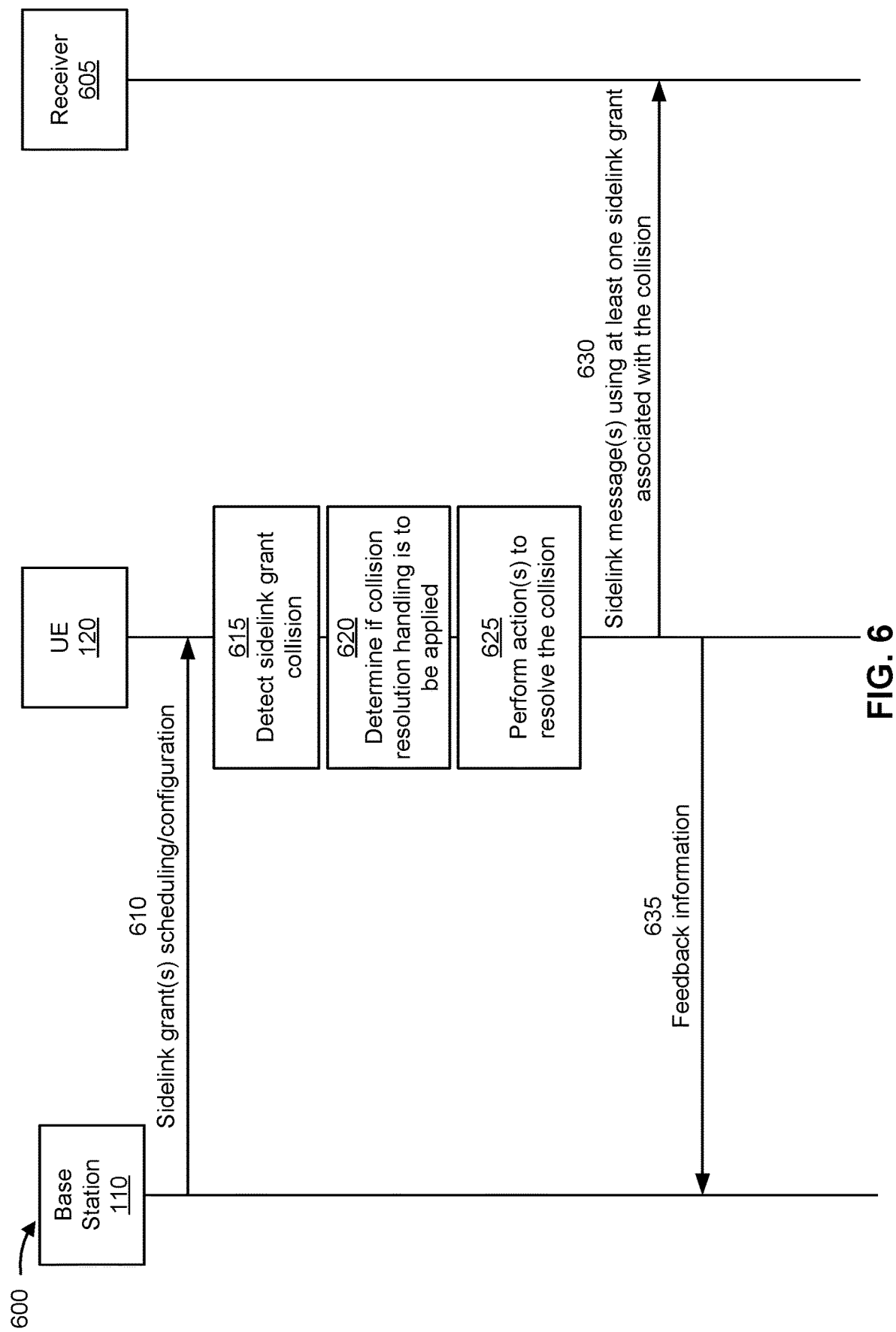
FIG. 6 is a diagram illustrating an example associated with sidelink grant collision handling, in accordance with the present disclosure.

FIG. 6 is a diagram illustrating an example 600 associated with sidelink grant collision handling, in accordance with the present disclosure. As shown in FIG. 6, a network entity (e.g., depicted and described herein as a base station 110 as an example) and a UE 120 may communicate with one another in a wireless network, such as the wireless network 100. The UE 120 may be a sidelink UE in a similar manner as described in connection with FIGS. 3-5. For example, the UE 120 may communicate, via a sidelink channel, with a receiver 605. The receiver 605 may be a sidelink device, another UE 120, and/or a roadside unit, among other examples.

In some aspects, the base station 110 may transmit, and the UE 120 may receive, configuration information. In some aspects, the UE 120 may receive configuration information from another device (e.g., from another base station or another UE). In some aspects, the UE 120 may receive the configuration information via RRC signaling and/or medium access control (MAC) signaling (e.g., MAC control elements (MAC-CEs)). In some aspects, the configuration information may include an indication of one or more configuration parameters (e.g., already known to the UE 120) for selection by the UE 120 and/or explicit configuration information for the UE 120 to use to configure the UE 120.

In some aspects, the configuration information may indicate that the UE 120 is to perform collision handling for colliding sidelink grants, as described herein. For example, the configuration information may indicate that the UE 120 is to perform one or more actions based at least in part on detecting colliding sidelink grants. For example, the configuration information may enable (e.g., via a flag or another indicator) the UE 120 to perform sidelink grant collision handling, as described herein. In some aspects, the configuration information may indicate the action(s) to be performed to handle or resolve sidelink grant collisions.

The UE 120 may configure the UE 120 for communicating with the base station 110 and/or for communicating on a sidelink channel. In some aspects, the UE 120 may configure the UE 120 based at least in part on the configuration information. In some aspects, the UE 120 may be configured to perform one or more operations described herein.

In some aspects, the UE 120 may transmit, and the base station 110 may receive, an indication of a capability of the UE 120 to perform sidelink grant collision handling. For example, the UE 120 may transmit capability information indicating whether the UE 120 is capable of performing sidelink grant collision handling as described herein. In some aspects, the UE 120 may transmit the indication of the capability via RRC signaling, one or more MAC-CEs, and/or a PUCCH message, among other examples. In some aspects, the base station 110 may determine the configuration information based at least in part on the indication of the capability transmitted by the UE 120.

As shown by reference number 610, the base station 110 may transmit, and the UE 120 may receive, an indication of one or more sidelink grants. For example, the base station 110 may transmit, and the UE 120 may receive, an indication of a first sidelink grant. Similarly, the base station 110 may transmit, and the UE 120 may receive, an indication of a second sidelink grant. In some aspects, the first sidelink grant and/or the second sidelink grant may be CG sidelink grants. For example, the base station 110 may transmit an RRC configuration indicating one or more CG sidelink grants. For a type 1 sidelink grant, an RRC message may activate and/or trigger the CG sidelink grant. For a type 2 sidelink grant, a DCI message (e.g., a DCI message using DCI Format 3_0) may activate and/or trigger the CG sidelink grant. In some aspects, the first sidelink grant and/or the second sidelink grant may be a DG sidelink grant. For example, the base station 110 may transmit, and the UE 120 may receive, a DCI message indicating the DG sidelink grant. The base station 110 may indicate, configure, and/or schedule other sidelink grants in a similar manner.

A sidelink grant (e.g., the first sidelink grant and/or the second sidelink grant) may be associated with a set of resources (e.g., time domain resources and/or frequency domain resources). A configuration or a scheduling of the sidelink grant may indicate the set of resources. For example, for a CG sidelink grant, an RRC message may indicate the set of resources (and/or a periodicity) associated with the CG sidelink grant. For a DG sidelink grant, a DCI message (or another dynamic message) may indicate the set of resources associated with the DG sidelink grant. The base station 110 may configure and/or schedule a set of sidelink grants for the UE 120. For example, the UE 120 may be associated with one or more activated CG sidelink grants and/or one or more scheduled DG sidelink grants.

As shown by reference number 615, the UE 120 may detect a sidelink grant collision. For example, the UE 120 may detect a collision associated with the sidelink grants configured and/or scheduled by the base station 110. The collision may be associated with two or more sidelink grants associated with the UE 120. For example, the collision may be associated with the first sidelink grant and the second sidelink grant. The UE 120 may detect the sidelink grant collision based at least in part on detecting that a first set of resources (e.g., associated with the first sidelink grant) at least partially overlaps in the time domain (and/or the frequency domain) with a second set of resources (e.g., associated with the second sidelink grant). The UE 120 may detect a set of colliding sidelink grants (e.g., that includes the first sidelink grant, the second sidelink grant, and/or one or more other sidelink grants). For example, any sidelink grants that overlap at least partially in the time domain (e.g., in the same slot and/or the same TTI) may be included in the set of colliding sidelink grants. Therefore, as used herein, "set of colliding sidelink grants" may refer to two or more sidelink grants associated with a collision, as described herein.

As shown by reference number 620, the UE 120 may determine if collision resolution handling is to be applied by the UE 120. In some aspects, the UE 120 may determine if collision resolution handling is to be applied by the UE 120 based at least in part on the configuration information. The UE 120 may determine if the UE 120 is to take an action based at least in part on detecting a collision among sidelink grants. In some aspects, the UE 120 may determine if collision resolution handling is to be applied based at least in part on the configuration information. For example, the configuration information may enable, or activate, the UE 120 to perform collision resolution handling for sidelink grants.

In some aspects, the UE 120 may determine if collision resolution handling is to be applied based at least in part on a sidelink grant type of the sidelink grants associated with the collision. For example, in some aspects, the UE 120 may apply collision resolution handling based at least in part on all sidelink grants associated with the collision being CG sidelink grants (e.g., the UE 120 may perform an action to resolve a collision among the first sidelink grant and the second sidelink grant based at least in part on the first sidelink grant and the second sidelink grant both being sidelink configured grants). In other words, in some aspects, if any sidelink grant associated with the collision is a DG sidelink grant, then the UE 120 may refrain from performing an action to resolve the collision.

In some other aspects, the UE 120 may apply collision resolution handling based at least in part on at least one of the sidelink grants associated with the collision being a CG sidelink grant. For example, the UE 120 may perform an action to resolve a collision among the first sidelink grant and the second sidelink grant based at least in part on at least one of the first sidelink grant or the second sidelink grant being a sidelink configured grant. In other words, if any sidelink grant associated with the collision is a CG sidelink grant, then the UE 120 may perform an action to resolve the collision.

In some aspects, the UE 120 may determine if a transmission has been triggered for one or more of the sidelink grants associated with the collision. For example, in some cases, a UE 120 may be scheduled and/or configured with a sidelink grant. However, the UE 120 may use resources associated with the sidelink grant only if the UE 120 has traffic to transmit at a time that the sidelink grant occurs. Therefore, if the UE 120 does not have traffic to transmit in one or more of the sidelink grants associated with the collision, then the UE 120 may refrain from performing an action to resolve the collision. For example, the UE 120 may determine that collision resolution handling is to be applied based at least in part on at least two sidelink grants associated with the collision being associated with a triggered sidelink message transmission (e.g., being associated with a trigger to transmit a TB using the sidelink grant). In other words, the UE 120 may perform an action to resolve the collision if the UE 120 has data (e.g., a TB) to transmit using at least two of the sidelink grants associated with the collision. Otherwise, if the UE 120 has data (e.g., a TB) to transmit using only one (or none) of the sidelink grants associated with the collision, then the UE 120 may refrain from performing an action to resolve the collision (e.g., because no actual collision of transmitted data will occur).

In some aspects, one or more of the sidelink grants associated with the collision may be associated with a retransmission of a sidelink message. For example, a sidelink grant (or an occasion of a sidelink grant) may be configured and/or scheduled to allow for the UE 120 to transmit a retransmission of a sidelink message (e.g., that is transmitted in a prior sidelink grant or a prior occasion of the sidelink grant). In some cases, the initial transmission of the sidelink message may be successful and a retransmission may not be needed. Therefore, if one or more of the sidelink grants associated with the collision are associated with a retransmission, the UE 120 may wait to see if a retransmission is triggered before performing an action to resolve the collision. For example, in some cases, a first sidelink grant (associated with the collision) may be associated with a retransmission. The UE 120 may refrain from performing an action to resolve the collision based at least in part on the first sidelink grant being associated with a retransmission.

For example, the collision may be associated with the first sidelink grant and the second sidelink grant. The UE 120 may detect a first trigger associated with transmitting using the first sidelink grant (e.g., a trigger to transmit a TB using resources associated with the first sidelink grant). The UE 120 may detect a second trigger associated with transmitting using the second sidelink grant (e.g., a trigger to transmit a TB using resources associated with the second sidelink grant). The UE 120 may perform an action to resolve the collision based at least in part on detecting the first trigger and detecting the second trigger.

As shown by reference number 625, the UE 120 may perform one or more actions to resolve the collision. For example, the UE 120 may detect the collision (associated with a set of colliding sidelink grants) and may determine that collision resolution handling is to be applied by the UE 120. In some aspects, the action may include selecting one or more sidelink grants, from the set of colliding sidelink grants, to be used for sidelink transmissions. For example, the UE 120 may select up to a threshold number (e.g., X) of sidelink grants, associated with the collision, to be used for sidelink transmissions. In other words, the UE 120 may select up to X sidelink grants, from the set of colliding sidelink grants, to be used for sidelink transmissions. The remaining sidelink grants (e.g., that are not selected by the UE 120) may not be used for sidelink transmissions. In other words, the UE 120 may refrain from transmitting using sidelink grants, associated with the collision, that are not selected by the UE 120.

In some aspects, the threshold number (e.g., X) may be indicated by the base station 110. For example, the base station 110 may transmit, and the UE 120 may receive, an indication of the threshold number (e.g., X). In some aspects, the base station 110 may indicate the threshold number via the configuration information. In some aspects, the threshold number (e.g., X) may be specified or preconfigured on the UE 120 (e.g., via an original equipment manufacturer (OEM) configuration). For example, a value of the threshold number may be defined, or otherwise fixed, by a wireless communication standard, such as the 3GPP. In some aspects, the threshold number (e.g., a value of the threshold number) may be based at least in part on a capability of the UE 120. For example, the threshold number (e.g., a value of the threshold number) may be based at least in part on a number of antenna panels associated with the UE 120, a number of antennas associated with the UE 120, a number of radio frequency (RF) chains associated with the UE 120, an RF front end configuration of the UE 120, and/or a transmit power capability of the UE 120, among other examples. For example, the UE 120 may indicate the capability of the UE 120 via capability information transmitted to the base station 110, as described above.

As described above, the action to resolve the collision may include dropping (e.g., refraining from transmitting using resources associated with) any sidelink grants that are not selected by the UE 120. For example, the UE 120 may select at least one of the first sidelink grant or the second sidelink grant from the set of colliding sidelink grants to be used for the one or more sidelink messages. The UE 120 may refrain from transmitting sidelink messages using remaining sidelink grants (e.g., sidelink grants not selected by the UE 120) included in the set of colliding sidelink grants.

The UE 120 may select one or more (e.g., up to X) sidelink grants, from the set of colliding sidelink grants, to be used for sidelink transmissions based at least in part on one or more factors. For example, for a collision between a first sidelink grant and a second sidelink grant, the one or more factors may include a transmit power budget of the UE, channel state information (e.g., of the sidelink channel), beam information (e.g., a beam direction) associated with the first sidelink grant and beam information (e.g., a beam direction) associated with the second sidelink grant, a frequency gap (e.g., a number of resource blocks and/or a number of subchannels) between the first sidelink grant and the second sidelink, a peak to average power ratio (PAPR) threshold of the UE 120, a first packet delay budget (PDB) associated with the first sidelink grant, a second PDB associated with the second sidelink grant, a first priority associated with the first sidelink grant, a second priority associated with the second sidelink grant, and/or a receiver (e.g., the receiver 605) associated with at least one of the first sidelink grant or the second sidelink grant, among other examples. For example, the UE 120 may have a limited transmit power budget. Therefore, if the UE 120 were to transmit multiple sidelink messages in the same slot or the same TTI, the transmit power budget of the UE 120 may be exceeded. Therefore, the UE 120 may select one or more sidelink grants based at least in part on the transmit power budget of the UE 120, a first transmit power associated with the first sidelink grant, and a second transmit power associated with the second sidelink grant.

In some aspects, a beam direction (or spatial transmit direction) of sidelink messages to be transmitted using colliding sidelink grants may impact the selection of one or more sidelink grants by the UE 120. For example, depending on the RF front end configuration of the UE 120, the UE 120 may be unable to transmit simultaneously in similar directions. Alternatively, depending on the RF front end configuration of the UE 120, the UE 120 may be unable to transmit simultaneously in different directions. Therefore, the beam direction (or spatial transmit direction) of sidelink messages to be transmitted using colliding sidelink grants may impact the selection by the UE 120. In some aspects, the receiver (e.g., the receive 605) associated with sidelink messages to be transmitted using colliding sidelink grants may impact the selection by the UE 120. For example, in some aspects, the UE 120 may be capable of transmitting simultaneously only if the simultaneous transmissions are to the same receiver 605. Alternatively, the UE 120 may be capable of transmitting simultaneously only if the simultaneous transmissions are to different receivers 605.

In some aspects, the UE 120 may select a sidelink grant that is associated with traffic having a lowest PDB among the sidelink grants associated with the collision. For example, a low PDB may indicate that sidelink data and/or a TB needs to be transmitted within less amount of time (when compared to a higher PDB). Therefore, if sidelink data and/or a TB that is scheduled to be transmitted during a first sidelink grant has a lower PDB than a PDB associated with sidelink data and/or a TB that is scheduled to be transmitted during a second sidelink grant (e.g., where the first sidelink grant and the second sidelink grant are colliding), then the UE 120 may transmit using the first sidelink grant and may refrain from transmitting using the second sidelink grant (e.g., to resolve the collision and to ensure the sidelink data associated with the lower PDB is transmitted).

In some aspects, each sidelink grant may be associated with a priority (e.g., a priority level or a priority value). Additionally, or alternatively, traffic to be transmitted (using a sidelink grant) may be associated with a priority (e.g., a priority level or a priority value). For example, each sidelink grant may be configured (e.g., by the base station 110) with a priority. In some aspects, traffic (e.g., sidelink traffic)

associated with a higher priority may be mapped to (or scheduled using) sidelink grants associated with a higher priority (e.g., traffic with a certain priority level may be mapped to (or scheduled using) sidelink grants associated with the certain priority level). The UE 120 may select the one or more sidelink grants, from the set of colliding sidelink grants, based at last in part on priorities associated with the set of colliding sidelink grants. For example, the action to resolve the collision may include comparing a first priority associated with a first sidelink grant to a second priority associated with a second sidelink grant. The UE 120 may select at least one of the first sidelink grant or the second sidelink grant to be used for a sidelink transmission based at least in part on comparing the first priority to the second priority. For example, the UE 120 may select a sidelink grant, from the first sidelink grant and the second sidelink grant, that is associated with a higher priority. The UE 120 may transmit a sidelink message using the sidelink grant associated with the higher priority. The UE 120 may additionally transmit a sidelink message using a sidelink grant (e.g., from the first sidelink grant and the second sidelink grant) associated with the lower priority (e.g., if allowable under a transmit power budget associated with the UE 120). Alternatively, the UE 120 may refrain from transmitting a sidelink message using a sidelink grant (e.g., from the first sidelink grant and the second sidelink grant) associated with the lower priority. In this way, higher priority traffic may be prioritized by the UE 120 when selecting sidelink grants to be used for transmissions among the set of colliding sidelink grants.

In some aspects, the UE 120 may select one or more sidelink grants, from the set of colliding resources, based at least in part on index values associated with the set of colliding resources. For example, the UE 120 may select at least one of a first sidelink grant or a second sidelink grant to be used for a sidelink transmission based at least in part on a first index value associated with the first sidelink grant and a second index value associated with the second sidelink grant. For example, a priority may be assigned based at least in part on index value (e.g., a CG index value or a DG index value) of the sidelink grant. Therefore, certain sidelink grants may be prioritized (e.g., by the base station 110 and/or by the UE 120) based at least in part on the index values of the sidelink grants associated with the collision. In some aspects, CG configuration information may indicate a CG index associated with the CG configuration. High priority traffic (e.g., sidelink traffic associated with a high priority) may be mapped to, or scheduled using, (e.g., by the base station 110 and/or the UE 120) CG sidelink grants that have certain index values. Therefore, the UE 120 may select a sidelink grant, among the set of sidelink grants, to be used for sidelink transmission(s) based at least in part on the index value associated with the sidelink grant. In this way, higher priority traffic may be prioritized by the UE 120 when selecting sidelink grants to be used for transmissions among the set of colliding sidelink grants.

In some aspects, the UE 120 may select two (or more) sidelink grants, from the set of colliding sidelink grants, to be used for sidelink transmission based at least in part on a frequency gap (e.g., a number of resource blocks and/or a number of subchannels) between the two (or more) sidelink grants (e.g., between frequency domain resource allocations of the two (or more) sidelink grants). For example, as shown in FIG. 5 and by the frequency gap 520, two colliding sidelink grants may be separated (e.g., by a frequency gap) in the frequency domain. In some aspects, the UE 120 may be capable of simultaneous sidelink transmissions if the frequency gap between the frequency domain resource allocations of the simultaneous sidelink transmissions is less than a frequency gap threshold. In some aspects, the frequency gap threshold may be zero (e.g., the UE 120 may be capable of simultaneous sidelink transmissions if there is no frequency gap between the frequency domain resource allocations of the simultaneous sidelink transmissions). In some other aspects, the frequency gap threshold may be greater than zero. The frequency gap threshold may be indicated via the configuration information. For example, the base station 110 may transmit, and the UE 120 may receive, an indication of the frequency gap threshold. In some aspects, different frequency gap thresholds may be indicated or defined for different UE capabilities and/or for different traffic types (e.g., for different traffic priorities), among other examples.

The UE 120 may select both a first sidelink grant and a second sidelink grant for sidelink transmissions based at least in part on a frequency gap (e.g., a number of resource blocks and/or a number of subchannels) between a first set of resources (e.g., associated with the first sidelink grant) and a second set of resources (e.g., associated with the second sidelink grant) being less than or equal to the frequency gap threshold. If the frequency gap between the first set of resources and the second set of resources is greater than the frequency gap threshold, then the UE 120 may select a sidelink grant (e.g., from the first sidelink grant and the second sidelink grant) using one or more selections and/or determinations described elsewhere herein.

Additionally, the UE 120 may select both the first sidelink grant and the second sidelink grant for sidelink transmissions based at least in part on a total transmit power among a first sidelink message (e.g., transmitted using the first sidelink grant) and a second sidelink message (e.g., transmitted using the second sidelink grant) satisfying a transmit power threshold (e.g., transmit power budget associated with the UE 120 or a maximum transmit power of the UE 120). In some aspects, the UE 120 may select both the first sidelink grant and the second sidelink grant for sidelink transmissions based at least in part on the first sidelink message and the second sidelink message being associated with same receiver (e.g., the receiver 605).

In some aspects, a first set of resources (e.g., associated with the first sidelink grant) and a second set of resources (e.g., associated with the second sidelink grant) may at least partially overlap in the time domain and the frequency domain. In such examples, the UE 120 may puncture one of the sidelink grants (e.g., remove or disassociate frequency domain resources with one of the sidelink grants). For example, as used herein, "puncturing" may refer to the UE 120 removing resources from a set of resources associated with a sidelink grant. For example, the UE 120 may identify one or more common frequency domain resources associated with the first sidelink grant and the second sidelink grant. "Common frequency domain resources" may refer to frequency domain resources (e.g., resource blocks and/or subchannels) that are allocated to multiple sidelink grants. In some aspects, an action to resolve the collision may include allocating one or more common frequency domain resources, from the first set of resources and the second set of resources, to either the first sidelink grant or the second sidelink grant. In other words, the UE 120 may allocate the one or more common frequency domain resources to the first sidelink grant and may remove the one or more common frequency domain resources from the second set of resources associated with the second sidelink grant. For example, the UE 120 may puncture one of the sidelink grants such that there are no longer common frequency domain resources among the colliding sidelink grants.

In some aspects, which sidelink grant should be punctured may be determined by the UE 120. For example, the UE 120 may allocate the one or more common frequency domain resources to either the first sidelink grant or the second sidelink grant is based at least in part on a first size (e.g., a first packet size) of a first sidelink message (e.g., to be transmitted using the first sidelink grant), a second size (e.g., a second packet size) of a second sidelink message (e.g., to be transmitted using the first sidelink grant), a first priority associated with the first sidelink message (and/or a first priority associated with the first sidelink grant), a second priority associated with the second sidelink message (and/or a second priority associated with the second sidelink grant), and/or channel state information associated with the sidelink channel, among other examples. For example, the UE 120 may puncture a sidelink grant that is associated with a sidelink message having a smaller size. In some aspects, the UE 120 may puncture a sidelink grant that is associated with a lower priority and/or is associated with a sidelink message having a lower priority.

In some aspects, the UE 120 may prioritize sidelink grants associated with retransmissions over sidelink grants associated with initial (or first) transmissions of a sidelink message when selecting sidelink grants associated with a collision. "Prioritizing" a sidelink grant may refer to the UE 120 selecting that sidelink grant if the sidelink grant collides with another type of sidelink grant. For example, a first sidelink grant may be associated with a retransmission of a sidelink message and a second sidelink grant may be associated with an initial transmission of a sidelink message. The action to resolve the collision may include selecting the first sidelink grant to be used for transmission of sidelink messages and refraining from transmitting using the second sidelink grant based at least in part on the first sidelink grant being associated with the retransmission (and/or based at least in part on a priority of sidelink traffic associated with the second sidelink grant). For example, the UE 120 may prioritize the first sidelink grant (e.g., associated with the retransmission) based at least in part on the priority of sidelink traffic associated with the second sidelink grant being below a threshold priority level (e.g., being associated with a low priority).

Alternatively, the UE 120 may prioritize sidelink grants associated with initial (or first) transmissions over sidelink grants associated with retransmissions of a sidelink message when selecting sidelink grants associated with a collision. For example, the action to resolve the collision may include selecting the second sidelink grant to be used for transmission of sidelink messages and refraining from transmitting using the first sidelink grant based at least in part on the first sidelink grant being associated with the retransmission.

In some aspects, the UE 120 may prioritize DG sidelink grants of CG sidelink grants when selecting sidelink grants associated with a collision. For example, the UE 120 may prioritize dynamic grant sidelink grants over configured grant sidelink grants when performing action(s) to resolve the collision. Alternatively, the UE 120 may prioritize CG sidelink grants of DG sidelink grants when selecting sidelink grants associated with a collision. For example, the UE 120 may prioritize configured grant sidelink grants over dynamic grant sidelink grants when performing action(s) to resolve the collision.

In some aspects, the UE 120 may resolve collisions among sidelink grants having different sidelink grant types before resolving collisions among sidelink grants having the same sidelink grant type. For example, the UE 120 may perform a first action to resolve collisions among sidelink grants, included in a set of colliding sidelink grants, that are associated with different sidelink grant types. The UE 120 may perform a second action to resolve collisions among sidelink grants, included in the set of colliding sidelink grants, that are associated with a same sidelink grant type (e.g., after performing the first action). The first action and/or the second action may be any action described herein to resolve collisions among sidelink grants.

As shown by reference number 630, the UE 120 may transmit, and one or more receivers 605 may receive, a sidelink message using at least one sidelink grant that is associated with the collision. For example, the UE 120 may transmit one or more sidelink messages using at least one of a first sidelink grant or a second sidelink grant (e.g., associated with the collision) based at least in part on performing an action described herein. The UE 120 may transmit sidelink messages using selected (e.g., selected by the UE 120) sidelink grants that are associated with the UE 120. For example, the UE 120 may transmit a first sidelink message using a first sidelink grant and a first set of resources and may transmit a second sidelink message using a second sidelink grant and a second set of resources (e.g., if the both the first sidelink grant and the second sidelink grant are selected by the UE 120, as described herein).

As described above, the UE 120 may puncture one sidelink grant associated with the collision. The UE 120 may transmit a first sidelink message using the first sidelink grant and a first set of (punctured) resources (e.g., having one or more frequency domain resources removed from an originally configured or schedule set of resource associated with the first sidelink grant). The UE 120 may transmit a second sidelink message using a second sidelink grant and a second set of resources (e.g., where the second set of resources are not punctured). In some aspects, the UE 120 may transmit sidelink control information associated with the first sidelink message, indicating an updated frequency domain resource allocation associated with the first set of resources (e.g., based at least in part on puncturing the first sidelink grant). In other words, if the UE 120 punctures a sidelink grant, then the UE 120 may update a frequency domain resource allocation indicated by sidelink control information associated with the sidelink grant.

As shown by reference number 635, the UE 120 may transmit, and the base station 110 may receive, feedback information associated with sidelink grants that are associated with the collision. For example, as described above, the UE 120 may drop (e.g., refrain from transmitting using) a sidelink grant associated with the collision. Therefore, sidelink data (e.g., a TB) that was scheduled to be transmitted during the dropped sidelink grant may not be transmitted. In some aspects, the UE 120 may attempt (e.g., autonomously without receiving additional signaling or configuration from the base station 110) to transmit the sidelink data (e.g., the TB) in a future transmission occasion or a future sidelink grant. For example, the sidelink grant that was dropped may be a CG sidelink grant that is associated with periodic occasions available for the UE 120 to transmit during. The UE 120 may attempt to transmit the sidelink data (e.g., the TB) in a future occasion associated with the CG sidelink grant. In some aspects, the UE 120 may identify a future transmission occasion or future sidelink grant that is associated with the same HARQ process identifier as the HARQ process identifier associated with the dropped sidelink grant (e.g., to ensure a same HARQ process is applied to the sidelink data). The UE 120 may identify a future sidelink grant that can be used to transmit a sidelink message (e.g., the sidelink data and/or the TB). The UE 120 may transmit the sidelink message (e.g., the sidelink data and/or the TB) in the future sidelink grant associated with the dropped sidelink grant (e.g., the future sidelink grant having the same HARQ process identifier as the dropped sidelink grant). The UE 120 may transmit, to the base station 110, feedback information indicating that the sidelink message was successfully transmitted (e.g., the UE 120 may transmit acknowledgement (ACK) feedback to the base station 110). As a result, the UE 120 may be enabled to transmit sidelink data and/or a TB that was originally intended to be transmitted during a dropped sidelink grant that was associated with a collision.

In some aspects, the UE 120 may be unable to identify a future sidelink grant that can be used to transmit a sidelink message (e.g., the sidelink data and/or the TB). The UE 120 may transmit, to the base station 110, feedback information indicating that the first sidelink message was not successfully transmitted based at least in part on failing to identify a future sidelink grant that can be used to transmit the sidelink message. For example, the UE 120 may transmit negative ACK (NACK) feedback to the base station 110. The base station 110 may schedule and/or configure additional resources (e.g., an additional sidelink grant) for the UE 120 to transmit the sidelink message based at least in part on the UE 120 transmitting the NACK feedback. As a result, the UE 120 may be enabled to transmit sidelink data and/or a TB that was originally intended to be transmitted during a dropped sidelink grant that was associated with a collision.

As a result, the UE 120 may be enabled to efficiently handle sidelink grant collisions. For example, the UE 120 may be enabled to determine which sidelink grants and/or how many sidelink grants to use for sidelink messages when a collision occurs. For example, the UE 120 may be enabled to ensure that sidelink messages associated with a higher priority are transmitted when the sidelink grant to be used to transmit the sidelink message(s) are associated with a collision. As a result, the UE 120 may be enabled to transmit one or more sidelink messages using one or more sidelink grants associated with a collision based at least in part on performing one or more actions as described in more detail elsewhere herein. This may allow for additional sidelink grants to be scheduled and/or configured by the base station 110 (e.g., because the UE 120 is provided with mechanisms to handle potential collisions), improving a scheduling flexibility for the sidelink channel. Additionally, the sidelink grant collision handling described herein may improve efficiency associated with transmitting sidelink messages, and/or improve performance associated with transmitting sidelink messages, among other examples.

As indicated above, FIG. 6 is provided as an example. Other examples may differ from what is described with respect to FIG. 6.

Figure 7:
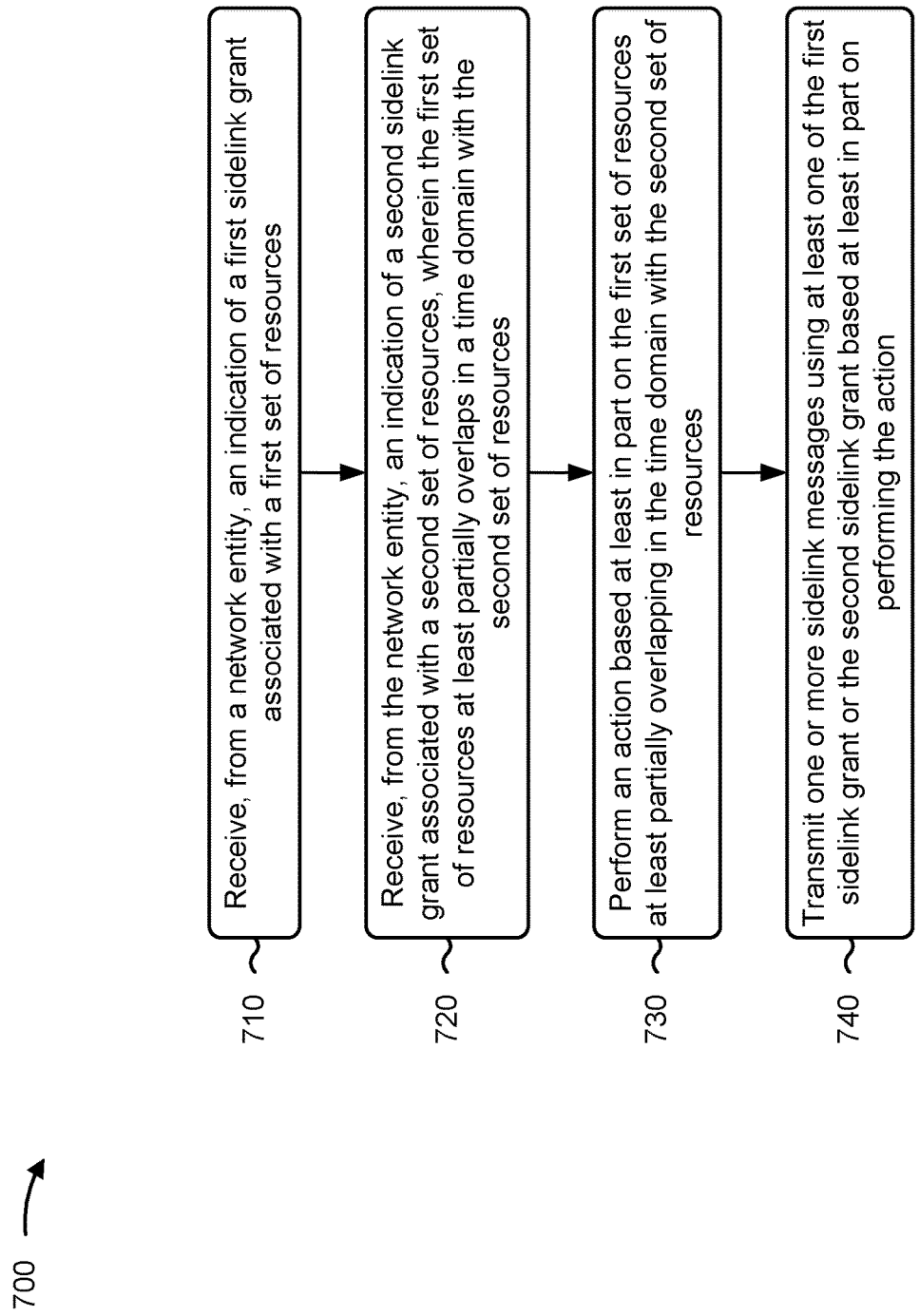
FIG. 7 is a diagram illustrating an example process associated with sidelink grant collision handling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with sidelink grant collision handling.

As shown in FIG. 7, in some aspects, process 700 may include receiving, from a network entity, an indication of a first sidelink grant associated with a first set of resources (block 710). For example, the UE (e.g., using communication manager 140 and/or reception component 802, depicted in FIG. 8) may receive, from a network entity, an indication of a first sidelink grant associated with a first set of resources, as described above.

As further shown in FIG. 7, in some aspects, process 700 may include receiving, from the network entity, an indication of a second sidelink grant associated with a second set of resources, wherein the first set of resources at least partially overlaps in a time domain with the second set of resources (block 720). For example, the UE (e.g., using communication manager 140 and/or reception component 802, depicted in FIG. 8) may receive, from the network entity, an indication of a second sidelink grant associated with a second set of resources, wherein the first set of resources at least partially overlaps in a time domain with the second set of resources, as described above.

As further shown in FIG. 7, in some aspects, process 700 may include performing an action based at least in part on the first set of resources at least partially overlapping in the time domain with the second set of resources (block 730). For example, the UE (e.g., using communication manager 140 and/or sidelink collision handling component 808, depicted in FIG. 8) may perform an action based at least in part on the first set of resources at least partially overlapping in the time domain with the second set of resources, as described above.

As further shown in FIG. 7, in some aspects, process 700 may include transmitting one or more sidelink messages using at least one of the first sidelink grant or the second sidelink grant based at least in part on performing the action (block 740). For example, the UE (e.g., using communication manager 140 and/or transmission component 804, depicted in FIG. 8) may transmit one or more sidelink messages using at least one of the first sidelink grant or the second sidelink grant based at least in part on performing the action, as described above.

Process 700 may include additional aspects, such as any single aspect or any combination of aspects described below and/or in connection with one or more other processes described elsewhere herein.

In a first aspect, the first sidelink grant and the second sidelink grant are included in a set of colliding sidelink grants, and performing the action includes selecting one or more sidelink grants from the set of colliding sidelink grants to be used for sidelink transmissions, wherein a number of the one or more sidelink grants is based at least in part on a threshold number.

In a second aspect, alone or in combination with the first aspect, process 700 includes receiving, from the network entity, an indication of the threshold number.

In a third aspect, alone or in combination with one or more of the first and second aspects, the threshold number is based at least in part on a capability of the UE.

In a fourth aspect, alone or in combination with one or more of the first through third aspects, the first sidelink grant and the second sidelink grant are included in a set of colliding sidelink grants, and performing the action includes selecting at least one of the first sidelink grant or the second sidelink grant from the set of colliding sidelink grants to be used for the one or more sidelink messages, and refraining from transmitting sidelink messages using remaining sidelink grants included in the set of colliding sidelink grants.

In a fifth aspect, alone or in combination with one or more of the first through fourth aspects, performing the action includes refraining from transmitting a first sidelink message using the first sidelink grant, identifying a future sidelink grant that can be used to transmit the first sidelink message, transmitting the first sidelink message in the future sidelink grant associated with the first sidelink grant, and transmitting, to the network entity, feedback information indicating that the first sidelink message was successfully transmitted.

In a sixth aspect, alone or in combination with one or more of the first through fifth aspects, performing the action includes refraining from transmitting a first sidelink message using the first sidelink grant, and transmitting, to the network entity, feedback information indicating that the first sidelink message was not successfully transmitted based at least in part on failing to identify a future sidelink grant that can be used to transmit the sidelink message.

In a seventh aspect, alone or in combination with one or more of the first through sixth aspects, performing the action includes comparing a first priority associated with the first sidelink grant to a second priority associated with the second sidelink grant, and selecting at least one of the first sidelink grant or the second sidelink grant to be used for a sidelink transmission based at least in part on comparing the first priority to the second priority.

In an eighth aspect, alone or in combination with one or more of the first through seventh aspects, performing the action includes selecting at least one of the first sidelink grant or the second sidelink grant to be used for a sidelink transmission based at least in part on a first index value associated with the first sidelink grant and a second index value associated with the second sidelink grant.

In a ninth aspect, alone or in combination with one or more of the first through eighth aspects, performing the action includes selecting both the first sidelink grant and the second sidelink grant for sidelink transmissions based at least in part on a frequency gap between the first set of resources and the second set of resources being less than or equal to a frequency gap threshold, and transmitting the one or more sidelink messages includes transmitting a first sidelink message using the first sidelink grant and the first set of resources, and transmitting a second sidelink message using the second sidelink grant and the second set of resources.

In a tenth aspect, alone or in combination with one or more of the first through ninth aspects, selecting both the first sidelink grant and the second sidelink grant for sidelink transmissions is further based at least in part on at least one of a total transmit power among the first sidelink message and the second sidelink message satisfying a transmit power threshold, or the first sidelink message and the second sidelink message being associated with a same receiver.

In an eleventh aspect, alone or in combination with one or more of the first through tenth aspects, the first set of resources at least partially overlap in a frequency domain with the second set of resources, and performing the action includes allocating one or more common frequency domain resources, from the first set of resources and the second set of resources, to either the first sidelink grant or the second sidelink grant, and transmitting the one or more sidelink messages includes transmitting a first sidelink message using the first sidelink grant and the first set of resources, and transmitting a second sidelink message using the second sidelink grant and the second set of resources.

In a twelfth aspect, alone or in combination with one or more of the first through eleventh aspects, allocating the one or more common frequency domain resources to either the first sidelink grant or the second sidelink grant includes allocating the one or more common frequency domain resources to the first sidelink grant, and removing the one or more common frequency domain resources from the second set of resources associated with the second sidelink grant.

In a thirteenth aspect, alone or in combination with one or more of the first through twelfth aspects, allocating the one or more common frequency domain resources to either the first sidelink grant or the second sidelink grant includes removing the one or more common frequency domain resources from the second set of resources associated with the second sidelink grant, and transmitting the second sidelink message using the second sidelink grant and the second set of resources includes transmitting sidelink control information associated with the second sidelink message, indicating an updated frequency domain resource allocation associated with the second set of resources.

In a fourteenth aspect, alone or in combination with one or more of the first through thirteenth aspects, allocating the one or more common frequency domain resources to either the first sidelink grant or the second sidelink grant is based at least in part on at least one of a first size of the first sidelink message, a second size of the second sidelink message, a first priority associated with the first sidelink message, a second priority associated with the second sidelink message, or channeling state information.

In a fifteenth aspect, alone or in combination with one or more of the first through fourteenth aspects, the first sidelink grant and the second sidelink grant are both sidelink configured grants, and performing the action is based at least in part on the first sidelink grant and the second sidelink grant both being sidelink configured grants.

In a sixteenth aspect, alone or in combination with one or more of the first through fifteenth aspects, at least one of the first sidelink grant or the second sidelink grant is a sidelink configured grant, and performing the action is based at least in part on at least one of the first sidelink grant or the second sidelink grant being the sidelink configured grant.

In a seventeenth aspect, alone or in combination with one or more of the first through sixteenth aspects, the first sidelink grant and the second sidelink grant are included in a set of colliding sidelink grants, and performing the action includes performing a first action to resolve collisions among sidelink grants, included in the set of colliding sidelink grants, that are associated with different sidelink grant types, and performing a second action to resolve collisions among sidelink grants, included in the set of colliding sidelink grants, that are associated with a same sidelink grant type.

In an eighteenth aspect, alone or in combination with one or more of the first through seventeenth aspects, the different sidelink grant types include configured grant sidelink grants and dynamic grant sidelink grants, and the first action includes prioritizing configured grant sidelink grants over dynamic grant sidelink grants.

In a nineteenth aspect, alone or in combination with one or more of the first through eighteenth aspects, the different sidelink grant types include configured grant sidelink grants and dynamic grant sidelink grants, and the first action includes prioritizing dynamic grant sidelink grants over configured grant sidelink grants.

In a twentieth aspect, alone or in combination with one or more of the first through nineteenth aspects, process 700 includes detecting a first trigger associated with transmitting using the first sidelink grant, and detecting a second trigger associated with transmitting using the second sidelink grant, and performing the action is based at least in part on detecting the first trigger and detecting the second trigger.

In a twenty-first aspect, alone or in combination with one or more of the first through twentieth aspects, the first sidelink grant is associated with a retransmission of a sidelink message, and performing the action includes refraining from transmitting using the first sidelink grant based at least in part on the first sidelink grant being associated with the retransmission.

In a twenty-second aspect, alone or in combination with one or more of the first through twenty-first aspects, the first sidelink grant is associated with a retransmission of a sidelink message, and performing the action includes refraining from transmitting using the second sidelink grant based at least in part on the first sidelink grant being associated with the retransmission.

In a twenty-third aspect, alone or in combination with one or more of the first through twenty-second aspects, refraining from transmitting using the second sidelink grant is based at least in part on a priority of sidelink traffic associated with the second sidelink grant.

In a twenty-fourth aspect, alone or in combination with one or more of the first through twenty-third aspects, the first sidelink grant is at least one of a configured grant sidelink grant or a dynamic grant sidelink grant, and the second sidelink grant is at least one of the configured grant sidelink grant or the dynamic grant sidelink grant.

In a twenty-fifth aspect, alone or in combination with one or more of the first through twenty-fourth aspects, process 700 includes receiving, from the network entity, an indication of a frequency gap threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
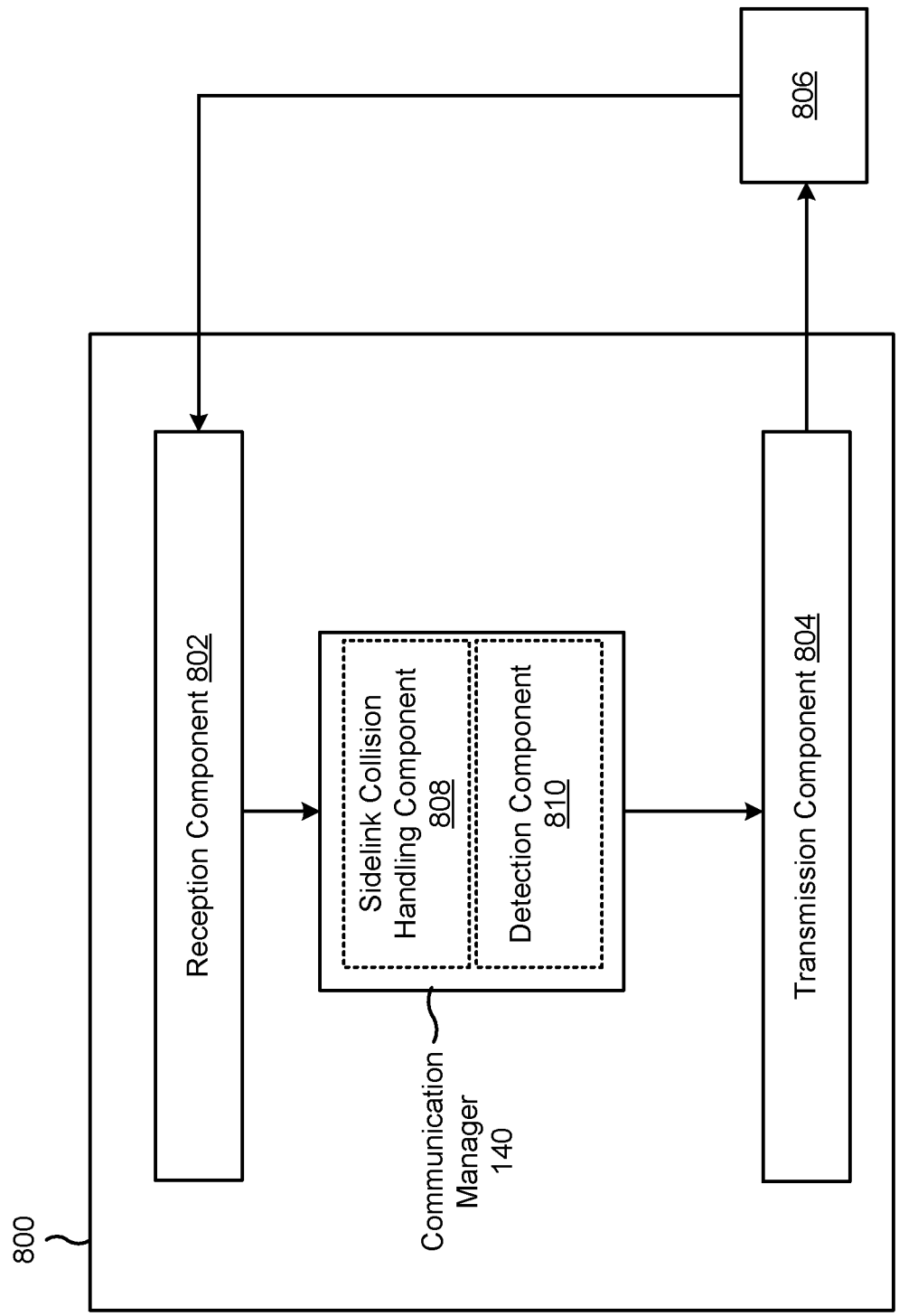
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, a network entity, or another wireless communication device) using the reception component 802 and the transmission component 804. As further shown, the apparatus 800 may include the communication manager 140. The communication manager 140 may include one or more of a sidelink collision handling component 808 and/or a detection component 810, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a network entity, an indication of a first sidelink grant associated with a first set of resources. The reception component 802 may receive, from the network entity, an indication of a second sidelink grant associated with a second set of resources, wherein the first set of resources at least partially overlaps in a time domain with the second set of resources. The sidelink collision handling component 808 may perform an action based at least in part on the first set of resources at least partially overlapping in the time domain with the second set of resources. The transmission component 804 may transmit one or more sidelink messages using at least one of the first sidelink grant or the second sidelink grant based at least in part on performing the action.

The sidelink collision handling component 808 may select selecting one or more sidelink grants from the set of colliding sidelink grants to be used for sidelink transmissions, wherein a number of the one or more sidelink grants is based at least in part on a threshold number. The reception component 802 may receive, from the network entity, an indication of the threshold number.

The sidelink collision handling component 808 may select at least one of the first sidelink grant or the second sidelink grant from the set of colliding sidelink grants to be used for the one or more sidelink messages. The sidelink collision handling component 808 may refrain from transmitting sidelink messages using remaining sidelink grants included in the set of colliding sidelink grants.

The sidelink collision handling component 808 may select a sidelink grant, from the first sidelink grant and the second sidelink grant, to be used for a transmission based at least in part on at least one of: a transmit power budget of the UE, channel state information, beam information associated with the first sidelink grant and beam information associated with the second sidelink grant, a frequency gap between the first sidelink grant and the second sidelink, a PAPR threshold, a first PDB associated with the first sidelink grant, a second PDB associated with the second sidelink grant, a first priority associated with the first sidelink grant, a second priority associated with the second sidelink grant, or a receiver associated with at least one of the first sidelink grant or the second sidelink grant.

The sidelink collision handling component 808 may compare a first priority associated with the first sidelink grant to a second priority associated with the second sidelink grant. The sidelink collision handling component 808 may select at least one of the first sidelink grant or the second sidelink grant to be used for a sidelink transmission based at least in part on comparing the first priority to the second priority.

The sidelink collision handling component 808 may select at least one of the first sidelink grant or the second sidelink grant to be used for a sidelink transmission based at least in part on a first index value associated with the first sidelink grant and a second index value associated with the second sidelink grant.

The sidelink collision handling component 808 may select both the first sidelink grant and the second sidelink grant for sidelink transmissions based at least in part on a frequency gap between the first set of resources and the second set of resources being less than or equal to a frequency gap threshold.

The sidelink collision handling component 808 may allocate one or more common frequency domain resources to the first sidelink grant. The sidelink collision handling component 808 may remove the one or more common frequency domain resources from the second set of resources associated with the second sidelink grant.

The detection component 810 may detect a first trigger associated with transmitting using the first sidelink grant. The detection component 810 may detect a second trigger associated with transmitting using the second sidelink grant wherein performing the action is based at least in part on detecting the first trigger and detecting the second trigger.

The reception component 802 may receive, from the network entity, an indication of a frequency gap threshold.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a network entity, an indication of a first sidelink grant associated with a first set of resources; receiving, from the network entity, an indication of a second sidelink grant associated with a second set of resources, wherein the first set of resources at least partially overlaps in a time domain with the second set of resources; performing an action based at least in part on the first set of resources at least partially overlapping in the time domain with the second set of resources; and transmitting one or more sidelink messages using at least one of the first sidelink grant or the second sidelink grant based at least in part on performing the action.

Aspect 2: The method of Aspect 1, wherein the first sidelink grant and the second sidelink grant are included in a set of colliding sidelink grants, and wherein performing the action comprises: selecting one or more sidelink grants from the set of colliding sidelink grants to be used for sidelink transmissions, wherein a number of the one or more sidelink grants is based at least in part on a threshold number.

Aspect 3: The method of Aspect 2, further comprising: receiving, from the network entity, an indication of the threshold number.

Aspect 4: The method of any of Aspects 2-3, wherein the threshold number is based at least in part on a capability of the UE.

Aspect 5: The method of any of Aspects 1-4, wherein the first sidelink grant and the second sidelink grant are included in a set of colliding sidelink grants, and wherein performing the action comprises: selecting at least one of the first sidelink grant or the second sidelink grant from the set of colliding sidelink grants to be used for the one or more sidelink messages; and refraining from transmitting sidelink messages using remaining sidelink grants included in the set of colliding sidelink grants.

Aspect 6: The method of any of Aspects 1-5, wherein performing the action comprises: selecting a sidelink grant, from the first sidelink grant and the second sidelink grant, to be used for a transmission based at least in part on at least one of: a transmit power budget of the UE, channel state information, beam information associated with the first sidelink grant and beam information associated with the second sidelink grant, a frequency gap between the first sidelink grant and the second sidelink, a peak to average power ratio (PAPR) threshold, a first packet delay budget (PDB) associated with the first sidelink grant, a second PDB associated with the second sidelink grant, a first priority associated with the first sidelink grant, a second priority associated with the second sidelink grant, or a receiver associated with at least one of the first sidelink grant or the second sidelink grant.

Aspect 7: The method of any of Aspects 1-6, wherein performing the action comprises: refraining from transmitting a first sidelink message using the first sidelink grant; identifying a future sidelink grant that can be used to transmit the first sidelink message; transmitting the first sidelink message in the future sidelink grant associated with the first sidelink grant; and transmitting, to the network entity, feedback information indicating that the first sidelink message was successfully transmitted.

Aspect 8: The method of any of Aspects 1-6, wherein performing the action comprises: refraining from transmitting a first sidelink message using the first sidelink grant; and transmitting, to the network entity, feedback information indicating that the first sidelink message was not successfully transmitted based at least in part on failing to identify a future sidelink grant that can be used to transmit the sidelink message.

Aspect 9: The method of any of Aspects 1-8, wherein performing the action comprises: comparing a first priority associated with the first sidelink grant to a second priority associated with the second sidelink grant; and selecting at least one of the first sidelink grant or the second sidelink grant to be used for a sidelink transmission based at least in part on comparing the first priority to the second priority.

Aspect 10: The method of any of Aspects 1-9, wherein performing the action comprises: selecting at least one of the first sidelink grant or the second sidelink grant to be used for a sidelink transmission based at least in part on a first index value associated with the first sidelink grant and a second index value associated with the second sidelink grant.

Aspect 11: The method of any of Aspects 1-10, wherein performing the action comprises: selecting both the first sidelink grant and the second sidelink grant for sidelink transmissions based at least in part on a frequency gap between the first set of resources and the second set of resources being less than or equal to a frequency gap threshold; wherein transmitting the one or more sidelink messages comprises: transmitting a first sidelink message using the first sidelink grant and the first set of resources; and transmitting a second sidelink message using the second sidelink grant and the second set of resources.

Aspect 12: The method of Aspect 11, wherein selecting both the first sidelink grant and the second sidelink grant for sidelink transmissions is further based at least in part on at least one of: a total transmit power among the first sidelink message and the second sidelink message satisfying a transmit power threshold; or the first sidelink message and the second sidelink message being associated with a same receiver.

Aspect 13: The method of any of Aspects 1-12, wherein the first set of resources at least partially overlap in a frequency domain with the second set of resources, and wherein performing the action comprises: allocating one or more common frequency domain resources, from the first set of resources and the second set of resources, to either the first sidelink grant or the second sidelink grant; and wherein transmitting the one or more sidelink messages comprises: transmitting a first sidelink message using the first sidelink grant and the first set of resources; and transmitting a second sidelink message using the second sidelink grant and the second set of resources.

Aspect 14: The method of Aspect 13, wherein allocating the one or more common frequency domain resources to either the first sidelink grant or the second sidelink grant comprises: allocating the one or more common frequency domain resources to the first sidelink grant; and removing the one or more common frequency domain resources from the second set of resources associated with the second sidelink grant.

Aspect 15: The method of any of Aspects 13-14, wherein allocating the one or more common frequency domain resources to either the first sidelink grant or the second sidelink grant comprises removing the one or more common frequency domain resources from the second set of resources associated with the second sidelink grant; and wherein transmitting the second sidelink message using the second sidelink grant and the second set of resources comprises: transmitting sidelink control information associated with the second sidelink message, indicating an updated frequency domain resource allocation associated with the second set of resources.

Aspect 16: The method of any of Aspects 13-15, wherein allocating the one or more common frequency domain resources to either the first sidelink grant or the second sidelink grant is based at least in part on at least one of: a first size of the first sidelink message, a second size of the second sidelink message, a first priority associated with the first sidelink message, a second priority associated with the second sidelink message, or channel state information.

Aspect 17: The method of any of Aspects 1-16, wherein the first sidelink grant and the second sidelink grant are both sidelink configured grants, and wherein performing the action is based at least in part on the first sidelink grant and the second sidelink grant both being sidelink configured grants.

Aspect 18: The method of any of Aspects 1-17, wherein at least one of the first sidelink grant or the second sidelink grant is a sidelink configured grant, and wherein performing the action is based at least in part on at least one of the first sidelink grant or the second sidelink grant being the sidelink configured grant.

Aspect 19: The method of any of Aspects 1-18, wherein the first sidelink grant and the second sidelink grant are included in a set of colliding sidelink grants, and wherein performing the action comprises: performing a first action to resolve collisions among sidelink grants, included in the set of colliding sidelink grants, that are associated with different sidelink grant types; and performing a second action to resolve collisions among sidelink grants, included in the set of colliding sidelink grants, that are associated with a same sidelink grant type.

Aspect 20: The method of Aspect 19, wherein the different sidelink grant types include configured grant sidelink grants and dynamic grant sidelink grants, and wherein the first action includes prioritizing configured grant sidelink grants over dynamic grant sidelink grants.

Aspect 21: The method of Aspect 19, wherein the different sidelink grant types include configured grant sidelink grants and dynamic grant sidelink grants, and wherein the first action includes prioritizing dynamic grant sidelink grants over configured grant sidelink grants.

Aspect 22: The method of any of Aspects 1-21, further comprising: detecting a first trigger associated with transmitting using the first sidelink grant; and detecting a second trigger associated with transmitting using the second sidelink grant, wherein performing the action is based at least in part on detecting the first trigger and detecting the second trigger.

Aspect 23: The method of any of Aspects 1-22, wherein the first sidelink grant is associated with a retransmission of a sidelink message, and wherein performing the action comprises: refraining from transmitting using the first sidelink grant based at least in part on the first sidelink grant being associated with the retransmission.

Aspect 24: The method of any of Aspects 1-22, wherein the first sidelink grant is associated with a retransmission of a sidelink message, and wherein performing the action comprises: refraining from transmitting using the second sidelink grant based at least in part on the first sidelink grant being associated with the retransmission.

Aspect 25: The method of Aspect 24, wherein refraining from transmitting using the second sidelink grant is based at least in part on a priority of sidelink traffic associated with the second sidelink grant.

Aspect 26: The method of any of Aspects 1-25, wherein the first sidelink grant is at least one of a configured grant sidelink grant or a dynamic grant sidelink grant, and wherein the second sidelink grant is at least one of the configured grant sidelink grant or the dynamic grant sidelink grant.

Aspect 27: The method of any of Aspects 1-26, further comprising: receiving, from the network entity, an indication of a frequency gap threshold.

Aspect 28: A method of wireless communication performed by a network entity, comprising: transmitting, to a user equipment (UE), configuration information indicating one or more actions to be performed by the UE to resolve sidelink grant collisions; transmitting, to the UE, an indication of a first sidelink grant associated with a first set of resources; and transmitting, to the UE, an indication of a second sidelink grant associated with a second set of resources, wherein the first set of resources at least partially overlaps in a time domain with the second set of resources, and wherein the UE a collision between the first sidelink grant and the second sidelink grant is resolved based on transmitting the configuration information.

Aspect 29: The method of Aspect 28, wherein the one or more actions includes the UE selecting one or more sidelink grants from the set of colliding sidelink grants to be used for sidelink transmissions, wherein a number of the one or more sidelink grants is based at least in part on a threshold number indicated by the configuration information.

Aspect 30: The method of any of Aspects 28-29, wherein the one or more actions includes the UE selecting a sidelink grant, from the first sidelink grant and the second sidelink grant, to be used for a transmission based at least in part on at least one of: a transmit power budget of the UE, channel state information, beam information associated with the first sidelink grant and beam information associated with the second sidelink grant, a frequency gap between the first sidelink grant and the second sidelink, a peak to average power ratio (PAPR) threshold, a first packet delay budget (PDB) associated with the first sidelink grant, a second PDB associated with the second sidelink grant, a first priority associated with the first sidelink grant, a second priority associated with the second sidelink grant, or a receiver associated with at least one of the first sidelink grant or the second sidelink grant.

Aspect 31: The method of any of Aspects 28-30, wherein the one or more actions indicate that the UE is to compare a first priority associated with the first sidelink grant to a second priority associated with the second sidelink grant, and select at least one of the first sidelink grant or the second sidelink grant to be used for a sidelink transmission based at least in part on comparing the first priority to the second priority.

Aspect 32: The method of any of Aspects 28-31, wherein the one or more actions indicate that the UE is to select at least one of the first sidelink grant or the second sidelink grant to be used for a sidelink transmission based at least in part on a first index value associated with the first sidelink grant and a second index value associated with the second sidelink grant.

Aspect 33: The method of any of Aspects 28-32, wherein the configuration information is radio resource control (RRC) configuration information.

Aspect 34: An apparatus for wireless communication at a device, comprising a processor; memory coupled with the processor; and instructions stored in the memory and executable by the processor to cause the apparatus to perform the method of one or more of Aspects 1-27.

Aspect 35: A device for wireless communication, comprising a memory and one or more processors coupled to the memory, the one or more processors configured to perform the method of one or more of Aspects 1-27.

Aspect 36: An apparatus for wireless communication, comprising at least one means for performing the method of one or more of Aspects 1-27.

Aspect 37: A non-transitory computer-readable medium storing code for wireless communication, the code comprising instructions executable by a processor to perform the method of one or more of Aspects 1-27.

Aspect 38: A non-transitory computer-readable medium storing a set of instructions for wireless communication, the set of instructions comprising one or more instructions that, when executed by one or more processors of a device, cause the device to perform the method of one or more of Aspects 1-27.

Aspect 39: An apparatus for wireless communication at a device, comprising a processor; memory coupled with the processor; and instructions stored in the memory and executable by the processor to cause the apparatus to perform the method of one or more of Aspects 28-33.

Aspect 40: A device for wireless communication, comprising a memory and one or more processors coupled to the memory, the one or more processors configured to perform the method of one or more of Aspects 28-33.

Aspect 41: An apparatus for wireless communication, comprising at least one means for performing the method of one or more of Aspects 28-33.

Aspect 42: A non-transitory computer-readable medium storing code for wireless communication, the code comprising instructions executable by a processor to perform the method of one or more of Aspects 28-33.

Aspect 43: A non-transitory computer-readable medium storing a set of instructions for wireless communication, the set of instructions comprising one or more instructions that, when executed by one or more processors of a device, cause the device to perform the method of one or more of Aspects 28-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network entity, an indication of a first sidelink grant associated with a first set of resources;
      receive, from the network entity, an indication of a second sidelink grant associated with a second set of resources, wherein the first set of resources at least partially overlaps in a time domain with the second set of resources;
      perform an action based at least in part on the first set of resources at least partially overlapping in the time domain with the second set of resources; and
      transmit one or more sidelink messages using at least one of the first sidelink grant or the second sidelink grant based at least in part on performing the action.

2. The UE of claim 1, wherein the first sidelink grant and the second sidelink grant are included in a set of colliding sidelink grants, and wherein the one or more processors, to perform the action, are configured to:
   select one or more sidelink grants from the set of colliding sidelink grants to be used for sidelink transmissions, wherein a number of the one or more selected sidelink grants is based at least in part on a threshold number.

3. The UE of claim 1, wherein the first sidelink grant and the second sidelink grant are included in a set of colliding sidelink grants, and wherein the one or more processors, to perform the action, are configured to:
   select at least one of the first sidelink grant or the second sidelink grant from the set of colliding sidelink grants to be used for the one or more sidelink messages; and
   refrain from transmitting sidelink messages using remaining sidelink grants included in the set of colliding sidelink grants.

4. The UE of claim 1, wherein the one or more processors, to perform the action, are configured to:
   select a sidelink grant, from the first sidelink grant and the second sidelink grant, to be used for a transmission based at least in part on at least one of a transmit power budget of the UE, channel state information, beam information associated with the first sidelink grant and beam information associated with the second sidelink grant, a frequency gap between the first sidelink grant and the second sidelink grant, a peak to average power ratio (PAPR) threshold, a first packet delay budget (PDB) associated with the first sidelink grant, a second PDB associated with the second sidelink grant, a first priority associated with the first sidelink grant, a second priority associated with the second sidelink grant, or a receiver associated with at least one of the first sidelink grant or the second sidelink grant.

5. The UE of claim 1, wherein the one or more processors, to perform the action, are configured to:
   refrain from transmitting a first sidelink message using the first sidelink grant;
   identify a future sidelink grant that can be used to transmit the first sidelink message;
   transmit the first sidelink message in the future sidelink grant associated with the first sidelink grant; and
   transmit, to the network entity, feedback information indicating that the first sidelink message was successfully transmitted.

6. The UE of claim 1, wherein the one or more processors, to perform the action, are configured to:
   refrain from transmitting a first sidelink message using the first sidelink grant; and
   transmit, to the network entity, feedback information indicating that the first sidelink message was not successfully transmitted based at least in part on failing to identify a future sidelink grant that can be used to transmit the first sidelink message.

7. The UE of claim 1, wherein the one or more processors, to perform the action, are configured to:
   compare a first priority associated with the first sidelink grant to a second priority associated with the second sidelink grant; and
   select at least one of the first sidelink grant or the second sidelink grant to be used for a sidelink transmission based at least in part on comparing the first priority to the second priority.

8. The UE of claim 1, wherein the one or more processors, to perform the action, are configured to:
   select at least one of the first sidelink grant or the second sidelink grant to be used for a sidelink transmission based at least in part on a first index value associated with the first sidelink grant and a second index value associated with the second sidelink grant.

9. The UE of claim 1, wherein the one or more processors, to perform the action, are configured to:
   select both the first sidelink grant and the second sidelink grant for sidelink transmissions based at least in part on a frequency gap between the first set of resources and the second set of resources being less than or equal to a frequency gap threshold, and wherein the one or more processors, to transmit the one or more sidelink messages, are configured to:
      transmit a first sidelink message using the first sidelink grant and the first set of resources; and
      transmit a second sidelink message using the second sidelink grant and the second set of resources.

10. The UE of claim 1, wherein the first set of resources at least partially overlap in a frequency domain with the second set of resources, and wherein the one or more processors, to perform the action, are configured to:
   allocate one or more common frequency domain resources, from the first set of resources and the second set of resources, to either the first sidelink grant or the second sidelink grant; and
   wherein the one or more processors, to transmit the one or more sidelink messages, are configured to:
      transmit a first sidelink message using the first sidelink grant and the first set of resources; and
      transmit a second sidelink message using the second sidelink grant and the second set of resources.

11. The UE of claim 1, wherein the first sidelink grant and the second sidelink grant are both sidelink configured grants, and wherein performing the action is based at least in part on the first sidelink grant and the second sidelink grant both being sidelink configured grants.

12. The UE of claim 1, wherein at least one of the first sidelink grant or the second sidelink grant is a sidelink configured grant, and wherein performing the action is based at least in part on at least one of the first sidelink grant or the second sidelink grant being the sidelink configured grant.

13. The UE of claim 1, wherein the first sidelink grant and the second sidelink grant are included in a set of colliding sidelink grants, and wherein the one or more processors, to perform the action, are configured to:
   perform a first action to resolve collisions among sidelink grants, included in the set of colliding sidelink grants, that are associated with different sidelink grant types; and
   perform a second action to resolve collisions among sidelink grants, included in the set of colliding sidelink grants, that are associated with a same sidelink grant type.

14. The UE of claim 1, wherein the one or more processors are further configured to:
   detect a first trigger associated with transmitting using the first sidelink grant; and
   detect a second trigger associated with transmitting using the second sidelink grant, wherein performing the action is based at least in part on detecting the first trigger and detecting the second trigger.

15. A method of wireless communication performed by a user equipment (UE), comprising:
   receiving, from a network entity, an indication of a first sidelink grant associated with a first set of resources;
   receiving, from the network entity, an indication of a second sidelink grant associated with a second set of resources, wherein the first set of resources at least partially overlaps in a time domain with the second set of resources;
   performing an action based at least in part on the first set of resources at least partially overlapping in the time domain with the second set of resources; and
   transmitting one or more sidelink messages using at least one of the first sidelink grant or the second sidelink grant based at least in part on performing the action.

16. The method of claim 15, wherein the first sidelink grant and the second sidelink grant are included in a set of colliding sidelink grants, and wherein performing the action comprises:
   selecting one or more sidelink grants from the set of colliding sidelink grants to be used for sidelink transmissions, wherein a number of the one or more selected sidelink grants is based at least in part on a threshold number.

17. The method of claim 15, wherein the first sidelink grant and the second sidelink grant are included in a set of colliding sidelink grants, and wherein performing the action comprises:
   selecting at least one of the first sidelink grant or the second sidelink grant from the set of colliding sidelink grants to be used for the one or more sidelink messages; and
   refraining from transmitting sidelink messages using remaining sidelink grants included in the set of colliding sidelink grants.

18. The method of claim 15, wherein performing the action comprises:
   selecting a sidelink grant, from the first sidelink grant and the second sidelink grant, to be used for a transmission based at least in part on at least one of:
      a transmit power budget of the UE, channel state information, beam information associated with the first sidelink grant and beam information associated with the second sidelink grant,
      a frequency gap between the first sidelink grant and the second sidelink grant, a peak to average power ratio (PAPR) threshold, a first packet delay budget (PDB) associated with the first sidelink grant, a second PDB associated with the second sidelink grant, a first priority associated with the first sidelink grant, a second priority associated with the second sidelink grant, or
      a receiver associated with at least one of the first sidelink grant or the second sidelink grant.

19. The method of claim 15, wherein performing the action comprises:
   refraining from transmitting a first sidelink message using the first sidelink grant;
   identifying a future sidelink grant that can be used to transmit the first sidelink message;
   transmitting the first sidelink message in the future sidelink grant associated with the first sidelink grant; and
   transmitting, to the network entity, feedback information indicating that the first sidelink message was successfully transmitted.

20. The method of claim 15, wherein performing the action comprises:
   refraining from transmitting a first sidelink message using the first sidelink grant; and
   transmitting, to the network entity, feedback information indicating that the first sidelink message was not successfully transmitted based at least in part on failing to identify a future sidelink grant that can be used to transmit the first sidelink message.

21. The method of claim 15, wherein performing the action comprises:

comparing a first priority associated with the first sidelink grant to a second priority associated with the second sidelink grant; and
selecting at least one of the first sidelink grant or the second sidelink grant to be used for a sidelink transmission based at least in part on comparing the first priority to the second priority.

22. The method of claim 15, wherein performing the action comprises:
selecting at least one of the first sidelink grant or the second sidelink grant to be used for a sidelink transmission based at least in part on a first index value associated with the first sidelink grant and a second index value associated with the second sidelink grant.

23. The method of claim 15, wherein performing the action comprises:
selecting both the first sidelink grant and the second sidelink grant for sidelink transmissions based at least in part on a frequency gap between the first set of resources and the second set of resources being less than or equal to a frequency gap threshold, and wherein transmitting the one or more sidelink messages comprises:
transmitting a first sidelink message using the first sidelink grant and the first set of resources; and
transmitting a second sidelink message using the second sidelink grant and the second set of resources.

24. The method of claim 15, wherein the first set of resources at least partially overlap in a frequency domain with the second set of resources, and wherein performing the action comprises:
allocating one or more common frequency domain resources, from the first set of resources and the second set of resources, to either the first sidelink grant or the second sidelink grant; and
wherein transmitting the one or more sidelink messages comprises:
transmitting a first sidelink message using the first sidelink grant and the first set of resources; and
transmitting a second sidelink message using the second sidelink grant and the second set of resources.

25. The method of claim 15, wherein the first sidelink grant and the second sidelink grant are both sidelink configured grants, and wherein performing the action is based at least in part on the first sidelink grant and the second sidelink grant both being sidelink configured grants.

26. A non-transitory computer-readable medium storing a set of instructions for wireless communication, the set of instructions comprising:
one or more instructions that, when executed by one or more processors of a user equipment (UE), cause the UE to:
receive, from a network entity, an indication of a first sidelink grant associated with a first set of resources;
receive, from the network entity, an indication of a second sidelink grant associated with a second set of resources, wherein the first set of resources at least partially overlaps in a time domain with the second set of resources;
perform an action based at least in part on the first set of resources at least partially overlapping in the time domain with the second set of resources; and
transmit one or more sidelink messages using at least one of the first sidelink grant or the second sidelink grant based at least in part on performing the action.

27. An apparatus for wireless communication, comprising:
means for receiving, from a network entity, an indication of a first sidelink grant associated with a first set of resources;
means for receiving, from the network entity, an indication of a second sidelink grant associated with a second set of resources, wherein the first set of resources at least partially overlaps in a time domain with the second set of resources;
means for performing an action based at least in part on the first set of resources at least partially overlapping in the time domain with the second set of resources; and
means for transmitting one or more sidelink messages using at least one of the first sidelink grant or the second sidelink grant based at least in part on performing the action.

28. The UE of claim 1, wherein the one or more processors are configured to:
receive, from the network entity, configuration information indicating that the UE is to perform the one or more actions based at least in part on detecting colliding sidelink grants.

29. The UE of claim 1, wherein the UE lacks a capability of transmitting multiple sidelink messages in a same transmission time interval (TTI).

30. The UE of claim 1, wherein the one or more processors, to perform the action, are configured to:
select, to be used for one or more sidelink transmissions, one or more sidelink grants from the set of colliding sidelink grants, wherein a number of the one or more selected sidelink grants is based at least in part on an upper bound on the number of the one or more selected sidelink grants that can be selected by the UE.

* * * * *